United States Patent [19]

Wehrli et al.

[11] 3,875,143

[45] Apr. 1, 1975

[54] 14 BETA,18-(EPOXYETHANOIMINO) STEROIDES

[75] Inventors: Hansuli Wehrli, Schaffhausen; Oskar Jeger, Zollikerberg, both of Switzerland

[73] Assignee: Ciba-Geigy Corporation, Ardsley, N.Y.

[22] Filed: May 30, 1973

[21] Appl. No.: 365,378

Related U.S. Application Data

[63] Continuation-in-part of Ser. No. 82,183, Oct. 19, 1970, abandoned.

[30] Foreign Application Priority Data
May 30, 1972  Switzerland.......................... 7967/72
Jan. 25, 1973  Switzerland.......................... 1080/73

[52] U.S. Cl...................... 260/239.5, 260/239.55 R
[51] Int. Cl............................................ C07c 173/10
[58] Field of Search ....../Machine Searched Steroids

[56] References Cited
OTHER PUBLICATIONS

Tokuyama et al., J.A.C.S. 91, pages 3931–3937, 7/69.

*Primary Examiner*—Henry A. French
*Attorney, Agent, or Firm*—Joseph G. Kolodny; John J. Maitner; Theodore O. Groeger

[57] ABSTRACT

Compounds of the class of 14$\beta$,18-(epoxyethanoimino)-pregnane derivatives and their pharmaceutically acceptable acid addition salts have cardiotonic activity. The invention is especially concerned with the manufacture of compounds of the said type having the basic steroidal skeletal structure characteristic of batrachotoxinine A and batrachotoxin. In particular an advantageous synthetic route to such compounds and their analogues and derivatives is provided by the process of the invention. Epimers of the said alkaloids batrachotoxinine A and batrachotoxin having the R-configuration at the 20-alcoholic function are also easily accessible by the process of the invention.

24 Claims, No Drawings

14 BETA, 18-(EPOXYETHANOIMINO) STEROIDES

CROSS REFERENCE TO RELATED APPLICATIONS

This is a continuation in part of application Ser. No. 82,183 filed on Oct. 19, 1970, now abandoned.

DETAILED DESCRIPTIONS

The present invention relates to derivatives of $14\beta,1$-8-(epoxyethanoimino)-pregnanes and pharmaceutically acceptable acid addition salts thereof with useful pharmacological activity and to pharmaceutical compositions containing them.

More particularly, the present invention relates to compounds of the formula

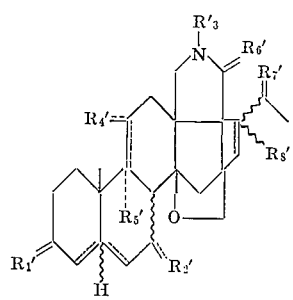

(A)

wherein $R_1{}'$ represents a free or protected oxo group or a free, esterified or etherified hydroxyl group and a hydrogen atom, or a free or etherified hydroxyl group and together with $R_5{}'$ an epoxy radical, $R_2{}'$ a free or protected oxo radical or a free, esterified or etherified hydroxyl group and a hydrogen atom, or two hydrogen atoms, or, when, occurring at a double bond, one hydrogen atom, $R_3{}'$ represents a lower alkyl group, the benzyl group or hydrogen, $R_4{}'$ has the same meaning as $R_2{}'$, $R_5{}'$ is an $\alpha$-oriented hydrogen atom, an $\alpha$-oriented hydroxyl group or together with $R_1{}'$ an epoxy radical, $R_6{}'$ represents an oxo radical or two hydrogen atoms, $R_7{}'$ represents a free or protected oxo group or a free, esterified or etherified hydroxyl group and a hydrogen atom, and $R_8$ represents an $\alpha$- or $\beta$-oriented hydrogen atom, or a free, esterified or etherified hydroxyl group, whereby double bonds may be present in the positions 5 or 4, when $R_1{}'$ represents a free oxo group, as well as 7,9(11) and 16 corresponding to the dotted lines with elimination of the 5-positioned H-atom or the substituents $R_5{}'$ and $R_8{}'$, as well as to pharmaceutically acceptable acid addition salts of the compounds of formula I in which $R_6{}'$ designates two hydrogen atoms.

Of particular importance among the products of the formula A as new pharmacological substances or intermediates are those of the following formula

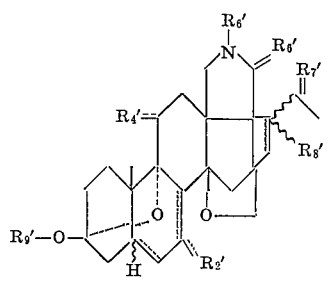

(B)

wherein $R_9{}'$ represents a lower alkyl group or the benzyl group and the rest of the symbols have the same meaning as for formula A) whereby double bonds may be present in the positions 5,7-and 16 corresponding to the dotted lines.

More particularly the present invention is directed to the preparation of steroid compounds of the above type having the formula (I)

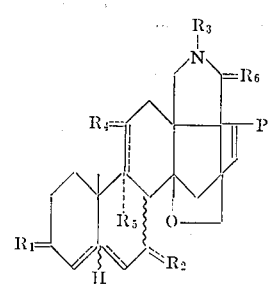

in which P denotes one of the two following partial formulae

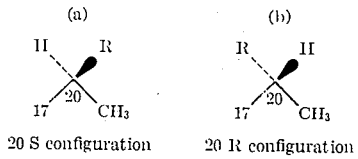

20 S configuration   20 R configuration wherein R represents a free, esterified or etherified hydroxyl group, $R_1$ denotes a free or protected oxo group or a free, esterified or etherified hydroxyl group together with a hydrogen atom, $R_2$ denotes two hydrogen atoms, or a hydrogen atom next to a 7,8-double bond, a free or protected oxo group or a hydrogen atom together with a free, esterified or etherified hydroxyl group, $R_3$ denotes hydrogen, a lower alkyl group or a monocyclic lower aliphatic aralkyl group, $R_4$ denotes two hydrogen atoms or a hydrogen atom next to a 9,11-double bond, or a free or protected oxo group, or a free, esterified or etherified hydroxyl group together with a hydrogen atom, $R_5$ denotes a hydrogen atom or a free, esterified or etherified hydroxyl group and $R_1$ together with $R_5$ denotes a 3-hydroxy-3,9-oxido group or a 3-hydroxy-3,9-oxido group having the 3-hydroxy-group in etherified or esterified form and $R_6$ denotes two hydrogen atoms or and oxo group, and in which, in one of the positions 4,5 or 5,6 and/or where relevant, in the case that $R_2$ or $R_4$ denotes a H atom, also in one of the positions 7,8 and/or 9,11, double bonds may be present, and their salts.

A lower aliphatic alkyl group $R_3$ is, in particular, a group of this type having 1-6 C atoms, preferably 1-3 C atoms, above all the methyl group. A monocyclic lower aliphatic aralkyl group is, in particular, a phenyl-lower alkyl group with 1-6 C atoms in the aliphatic part, above all the benzyl group.

The esterified hydroxyl groups mentioned are preferably derived from organic carboxylic acids of the aliphatic, alicyclic, aromatic or heterocyclic series, especially from those with 1-18 carbon atoms, for example lower aliphatic carboxylic acids with 1-6 C atoms, such as formic acid, propionic acid, the butyric acids, valeric acids, such as n-valeric acid or trimethylacetic acid, trifluoroacetic acid, caproic acid, such as $\beta$-trimethylpropionic acid or diethylacetic acid, oenanthic caprylic, pelargonic or capric acids, undecylic acids, for example undecylenic acid, lauric, myristic, palmitic or stearic acids, for example oleic acid, cyclopropane-, -butane-, -pentane-and -hexane-carboxylic acid, cyclopropylmethanecarboxylic acid, cyclobutylmethanecarboxylic acid, cyclopentylethanecarboxylic acid, cyclohexylethanecarboxylic acid, cyclopentyl-, cyclohexyl-or phenyl-acetic acids or -propionic acids, benzoic acid, phenoxyalkanoic acids, such as phenoxyacetic acid, dicarboxylic acids, such as succinic acids, phthalic acid, quinolinic acid, furane-2-carboxylic acid, 6-tert.-butyl-furane-2-carboxylic acid, 5-bromo-furane-2-carboxylic acid, nicotinic acid or isonicotinic acid, or pyrrolecarboxylic acids and substituted, for example alkyl-substituted, pyrrolecarboxylic acids, especially those of the general formulae

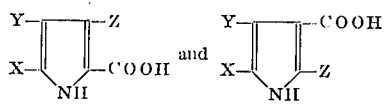

wherein X, Y and Z represent hydrogen or lower alkyl groups, such as, for example, pyrrole-2-carboxylic acid, 3-methyl-pyrrole-2-carboxylic acid, 3-ethyl-pyrrole-2-carboxylic acid, 4-methyl-pyrrole-2-carboxylic acid, 4-ethyl-pyrrole-2-carboxylic acid, 5-methyl-pyrrole-2-carboxylic acid, 5-ethyl-pyrrole-2-carboxylic acid, 3,4-dimethyl-pyrrole-2-carboxylic acid, 3,5-dimethyl-pyrrole-2-carboxylic acid, 4,5-dimethyl-pyrrole-2-carboxylic acid, 3,4,5-trimethyl-pyrrole-2-carboxylic acid, pyrrole-3-carboxylic acid, 2-methyl-pyrrole-3-carboxylic acid, 2-ethyl-pyrrole-3-carboxylic acid, 4-methyl-pyrrole-3-carboxylic acid, 4-ethyl-pyrrole-3-carboxylic acid, 5-methyl-pyrrole-3-carboxylic acid, 5-ethyl-pyrrole-3-carboxylic acid, 2,4-dimethyl-pyrrole-3-carboxylic acid, 2,4-dimethyl-5-ethyl-pyrrole-3-carboxylic acid, 2,5-dimethyl-pyrrole-3-carboxylic acid, 4,5-dimethyl-pyrrole-3-carboxylic acid, 2-ethyl-4-methyl-pyrrole-3-carboxylic acid, 2,4,5-trimethyl-pyrrole-3-carboxylic acid or 2,4,5-trimethyl- or -triethyl-pyrrole-3-carboxylic acid. The pyrrolecarboxylic acids mentioned can also be alkylated or acylated at the N-atom, as, for example, in the case of 2,4-dimethyl-1-acetyl-pyrrole-3-carboxylic acid or of 1,2,-4,5-tetramethyl-pyrrole-3-carboxylic acid. The esterified hydroxyl groups can however also be derived from sulphonic acids, such as benzenesulphonic acids, or from inorganic acids, such as, for example, phosphoric or sulphuric acids.

Etherified hydroxyl groups are preferably especially those which are derived from alcohols with 1–8 carbon atoms, such as lower aliphatic alkanols such as ethyl alcohol, methyl alcohol, propyl alcohol, iso-propyl alcohol, butyl alcohols or amyl alcohols or from araliphatic alcohols, especially from monocyclic aryl-lower aliphatic alcohols, such as benzyl alcohol, or from heterocyclic alcohols, such as α-tetrahydropyranol or α-tetrahydrofuranol. Further possible ether groups are the tetrahydropyran-2-yloxy group, and the 4-methoxy-tetrahydropyran-4-yloxy group.

Protected oxo radicals are, for example, ketal groups, preferably those which are derived from lower alkanediols or alkanols, for example, from ethylene glycol, methanol or ethanol.

A protected oxo group in the 3-position can, in particular, also be in the form of the 3-hydroxy-3,9-oxidohemiketal group, or in the form of the 3-ether or 3-ester of such a ketal group, the ethers and esters being derived, for example, from the abovementioned alcohols or acids respectively, preferably from lower aliphatic alcohols or acids respectively. In particular, this hemiketal group represents a 3α,9α-epoxy-3β-hydroxyl group or its 3-ether or ester.

The salts of the compounds of the formula I are acid addition salts and are preferably derived from therapeutically utilisable acids, such as, for example, hydrogen halide acids, sulphuric acids, phosphoric acids, nitric acid and perchloric acid; aliphatic, alicyclic, aromatic or heterocyclic carboxylic acids or sulphonic acids, such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic or p-aminosalicylic acid, embonic acid, methanesulphonic, ethanesulphonic, hydroxyethanesulphonic and ethylenesulphonic acid; halogenobenzenesulphonic, toluenesulphonic and naphthalenesulphonic acids or sulphanilic acid, methionine, tryptophane, lysine or arginine.

These or other salts of the new compounds such as, for example, the picrates, can also serve for the purification of the bases obtained, by converting the bases into salts, isolating these and again liberating the bases from the salts. Because of the close relationship between the bases in the free form and in the form of their salts, the free bases are also to be understood, in the preceding and following text, where appropriate to include the corresponding salts, with respect to general sense and intended use.

The compounds of the above formula A, B and I and the salts possess valuable pharmacological properties. They selectively increase the permeability of muscle membranes and nerve membranes to sodium ions. The sodium ion influx which is increased thereby leads to an acceleration of depolarisation and hence also of muscle contraction. Since, according to recent findings, substances possessing a cardiac activity, of the digitalis-strophanthin type, inhibit the active sodium ion transport from muscle fibres by blocking the transport-ATP-ase of the membranes and hence also increase the sodium ion concentration and accelerate depolarisation and muscle contraction, the compounds of the general formulae A, B and I lead, via the different mechanism of action which has already been mentioned, in the end effect to therapeutic actions which resemble those of cardiac-active digitalis substances, such as intensification of the systoles and of the minute volume of the heart.

The compounds of the formula A, B and I are however also intermediate products for the manufacture of pharmacologically active compounds.

Amongst the products of formula I compounds to be particularly singled out are those of the formula

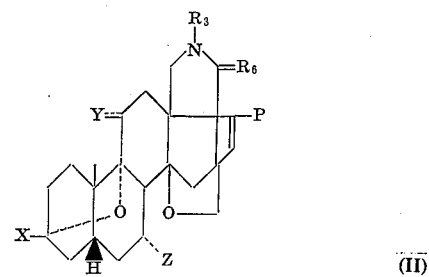

(II)

wherein P possesses the meaning indicated for the formula I, the group R represents a free hydroxyl group or a hydroxyl group esterified with one of the abovementioned carboxylic acids, $R_6$ denotes two hydrogen atoms or an oxo group, $R_3$ denotes a lower alkyl group with 1–6 C atoms, X denotes a free, esterified or etherified hydroxyl group, Y denotes a free or esterified hydroxyl group together with a hydrogen atom, or the oxo group, and Z denotes a hydrogen atom or a free or esterified hydroxyl group and which can optionally, when Z denotes a H atom, also contain a 7,8 double bond, and their salts. The ester groups, whereby there is especially also to be understood an esterified hydroxyl group R, are preferably in turn those of the abovementioned carboxylic acids or inorganic acids or sulphonic acids. In particular, esterified hydroxyl groups, X, Y and Z are those derived from lower aliphatic carboxylic acids, above all from acetic acid, whilst an esterified hydroxyl group R in the 20-position is preferably one derived from the abovementioned pyrrolecarboxylic acids. The etherified hydroxyl groups are preferably derived from lower aliphatic alcohols with 1–8 C atoms or from one of the abovementioned heterocyclic alcohols. A lower aliphatic alkyl group $R_3$ is preferably a group with 1–6 C atoms, especially a methyl group.

Compounds of the formula II are, for example, the known alkaloids of the batrachotoxin and batrachotoxinin group, especially batrachotoxinin A and its 20-esters which are derived from the pyrrolecarboxylic acids and alkyl-substituted pyrrolecarboxylic acids characterised above, such as the highly active alkaloids batrachotoxin and homobatrachotoxin, as well as 3-0-methyl-7,8-dihydroepibatrachotoxinin A.

The remaining compounds of the formulae I and II are new. Compounds to be singled out are those of the formula (II) in which P represents the side chain of partial formula (a) or (b), above all those in which $R_6$ represents two H atoms. Compounds which warrant particular interest are those of the formula (II) in which Z denotes hydrogen next to a 7,8-double bond or a free or esterified hydroxyl group and $R_6$ denotes 2 H atoms, and wherein P represents the side chain of the formula (b), and amongst these, above all, the compounds in which X and optionally Z represents a free hydroxyl group or a lower alkoxy group with 1–6 C atoms or a lower aliphatic acyloxy group with 1–6 C atoms and Y represents a free hydroxyl group or a lower aliphatic acyloxy group with 1–6 C atoms and $R_3$ represents a lower alkyl group with 1–3 C atoms, whilst R in the partial formula (b) represents the free hydroxyl group or an esterified hydroxyl group with 1–18 carbon atoms, especially a lower aliphatic ester group with 1–6 C atoms or an ester group derived from a pyrrole-2- or -3-carboxylic acid or from a lower alkyl-substituted pyrrole-2- or pyrrole-3-carboxylic acid or its N-lower alkyl or lower acyl derivatives.

Amongst the compounds of the formula II, wherein P represents the side chain of the above partial formula (a), compounds in which Z denotes hydrogen or a free or esterified hydroxyl group and $R_6$ denotes 2 H atoms are of importance, and amongst these above all the compounds in which X and optionally Z represents a free hydroxyl group or a lower alkoxy group with 1–6 C atoms or a lower aliphatic acyloxy group with 1–6 C atoms and Y represents a free hydroxyl group or a lower aliphatic acyloxy group with 1–6 C atoms and $R_3$ represents a lower alkyl group with 1–3 C atoms, whilst R in the partial formula (a) represents the free hydroxyl group or an esterified hydroxyl group with 1–18 carbon atoms, especially a lower aliphatic ester group with 1–6 C atoms, or an ester group derived from a pyrrole-2- or -3-carboxylic acid or a lower alkyl-substituted pyrrole-2- or -3-carboxylic acid or its N-lower alkyl or lower acyl derivatives.

Specific compounds are, for example, epibatrachotoxinin A (that is to say the compound corresponding to batrachotoxinin A, having a 20 R configuration instead of a 20–S configuration), and its esters and ethers, especially those which are derived from the acids or alcohols described above as being preferred, especially the 20-esters with the pyrrolecarboxylic acids mentioned, especially 2,4,5-trimethyl-pyrrole-3-carboxylic acid, 2,4-dimethyl-pyrrole-3-carboxylic acid or 2-ethyl-4-methylpyrrole-carboxylic acid, and also 7,8-dihydro-batrachotoxinin A (20-S configuration) and its esters and ethers, especially the 20-esters of the acids just mentioned.

The compounds according to the formula II singled out above, wherein $R_6$ represents two hydrogen atoms, possess the abovementioned cardiotonic action to a particularly pronounced extent. In addition to being usable as medicaments in human medicine or veterinary medicine, they also serve as important auxiliaries for clarifying various pharmacological problems, especially in relation to the study of electrogenic membranes. These compounds can be manufactured from corresponding compounds in which $R_6$ represents an oxo group or from modification products thereof, which compounds thus represent important intermediate products.

The above compounds of formula (A) can be prepared by a process wherein compounds of the formula (C)

wherein X represents a halogen atom, such as chlorine, bromine or iodine and $R_1'$, $R_2'$, $R_4'$, $R_5'$, $R_7'$ and $R_8'$ have the meaning as in formula A and the double bonds mentioned there can be present, is cyclized in the presence of an acidbinding agent in an inert solvent, if desired, the lactam grouping is then reduced by means of a complex hydride to a cyclic amino group; and/or esterified hydroxyl groups in $R_7'$, $R_1'$, $R_2'$, and/or $R_4'$, protected oxo groups or an etherified hydroxyl group occurring together with an epoxy radical in $R_1'$ are set free; and/or free oxo groups $R_7'$, $R_1'$, $R_2'$, and $R_4'$ are reduced; and/or, if desired, free hydroxyl groups in $R_7'$, $R_1'$, $R_2'$ and $R_4'$ are oxidized to oxo radicals, or esterified or etherified; and/or, if desired, compounds of general formula A in which $R_6'$ denotes two hydrogen atoms, are converted into acid addition salts with inorganic or organic acids.

Particulars of how the cyclization and the other steps of this process can be effected are given below when discussing a preferred embodiment of the invention directed to the preparation of the compounds of the formula I above.

The compounds of the general formula (C) to be used as starting materials can, in turn, be obtained by
a. Partial alkaline hydrolysis of a compound of the general formula D

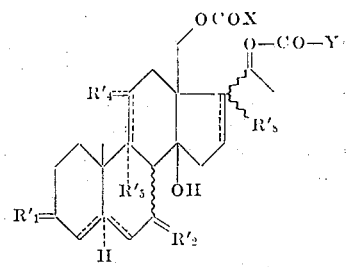

where the sumbols $R_1'$, $R_2'$, $R_4'$, $R_5'$ and $R_8'$ have the same meaning as for formula A, with the difference that hydroxyl or oxo groups as substituents $R_1'$, $R_4'$, $R_2'$ $R_8'$ are only in the protected form, and Y designates a lower alkyl group, hydrogen or the phenyl group
b. oxidising the compound so obtained in which the -hydroxyl groups has been formed, to the 18-oxo compound
c. reacting the aldehyde obtained (compounds E) with an amine of the formula $H_2N - R_3'$, wherein $R_3'$ has the same meaning as in formula (A) and optionally acylating the hydroxyl groups in $R_1'$, $R_2'$ and $R_4'$ which have been set free or reintroducing the acyl group in 20 position
d. then reducing the reaction product by means of a complex hydride
e. reacting the compound so obtained, in which the residue $NH-R_3'$ has entered in the 18-position instead of the aldehyde group originally present, with the equimolar amount or, where there are no secondary hydroxyl groups present, also with an excess of a reactive functional derivative of a halogen-acetic acid in the presence of an acid-binding agent
f. optionally, before or after the halogen-acetylation setting free by mild acid hydrolysis protected oxo radicals and/or a 3-alkoxy group adjacent to a 3,9-epoxy radical.

The partial hydrolysis, step (a) of the above-defined reaction sequence, is preferably performed by reacting the compound of general Formula D with about the equimolar or equivalent amount of a basic substance in an organic or organic/aqueous solvent at temperatures between about 20° and 120°C or the boiling temperature of the reaction medium. For example, the compound of general Formula D is heated or boiled for a short period with about an equivalent amount of sodium, potassium or lithium bicarbonate in alkanolic-aqueous solution, e.g. in hydrous methanol or ethanol; or a compound of general Formula D is reacted at room temperature or with heating with the equimolar amount of an alkali metal alkoxide, e.g. with sodium ethoxide in a lower alkanol such as methanol, ethanol or butanol. Weakly basic reagents such as the aforementioned alkali bicarbonates can also be used in excess when the temperature and length of the reaction are so chosen that when the hydrolysis is interrupted, only the 18-hydroxyl group has been set free. Suitable as acyl groups $-CO-R_{10}$ and $-CO-R_{11}$ are, e.g., acetyl, formyl, propionyl, butyryl, isobutyryl, valeryl, isovaleryl, pivaloyl or benzoyl groups. The two acyl groups may be identical or different, but in the latter case $-CO-R_{11}$ should be more readily split off than $-CO-R_{10}$, e.g. an acetyl group or formyl group together with a pivaloyl or benzoyl group as $-CO-R_{10}$.

The possibility of partially hydrolyzing the polyacyloxy compound of general Formula D in order to protect the 20-hydroxyl group during the subsequent oxidation of the 18-hydroxyl group which has been set free, is an important prerequisite for the success of the entire reaction sequence leading from the compounds of general Formula D to the compound of general Formula C and thus also for the production of the final products of general Formula A. That the compounds of general Formula D could be partially hydrolyzed, was in no way predictable, for according to A. L. Nussbaum, F. E. Carlon, E. P. Oliveto, E. Townley, P. Kabasakalian and D. H. R. Barton, Tetrahedron 18 (1962), 373–378, especially the upper part of page 375, the selective protection of one or the other of the two hydroxyl groups in the positions 18 and 20 in 18,2-0β-di-hydroxy-4-pregnen-3-one is not possible.

The oxidation according to step (b), in which the 18-hydroxy group is converted into the oxo radical thus forming an aldehyde group, can be performed e.g. by means of a 6-valent chromium compound, e.g. with a slight excess of a solution of chromium trioxide in hydrous sulphuric acid in acetone as reaction medium in the cold, furthermore also with chromium trioxide in pyridine. When ketal groups and/or a 3β-alkoxy group together with a 3α, 9α-epoxy radical are present, special car should be taken, when using chromium trioxide/sulphuric acid solutions, to maintain a low temperature, preferably at or below 0°C.

The reaction of the compounds E according to step (c) with amine $H_2N-R_1$ such as methylamine, ethylamine, n-propylamine, isopropyl-amine, n-butylamine, isobutylamine, benzylamine or ammonia, takes place e.g. at temperatures between about 80° and 150°C in an inert organic solvent such as benzene, toluene, methanol, ethanol or butanol, and if necessary in a closed vessel, depending on the boiling point of the amine and of the solvent as well as on the reaction temperature. The amine is preferably used in excess and can optionally be used as sole reaction medium. In the reaction according to the process, aminolysis of acyloxy groups which readily split off also occurs. The hydroxyl groups which have been set free are then optionally again acylated in the same manner as given for the hydroxyl groups of the end products, for example with an acetanhydride/pyridine mixture at room temperature. If desired, the hydroxyl group which has been set free can be left free, since it is not necessarily affected in the following steps of the process.

The following reduction, step (d), of the imino compounds is e.g. performed with sodium boro-hydride in aqueous methanol at temperatures between about 0° and 70°C, preferably at room temperature.

For the introduction of the halogeno-acetyl group into the secondary or primary 18-amino group, step (e), for example, a halogeno-acetyl halide or halogeno-acetanhydride, such as chloro-acetyl chloride, bromo-acetyl chloride, bromo-acetyl bromide, chloro-acetanhydride, bromo-acetanhydride, in an inert organic solvent, e.g. a hydrocarbon or halogenated hydrocarbon such as benzene or chloroform, is employed, whereby there is added as acid-binding agent, e.g., an aqueous alkali-metal hydroxide solution as second phase, as well as a solid inorganic basic substance such as potassium or sodium carbonate, or an organic base such as N-ethyl-diisopropylamine, triethylamine, sym. collidine or pyridine. The reaction is preferably performed at temperatures between 0° and about 60°C, whereby an excess of halogeno-acetylating agent should be avoided when there is a free secondary hydroxyl group and/or a free 3β-hydroxyl group as part of a cyclic hemiketal grouping together with the 3α,9α-epoxy radical present.

Conditions for the setting free of oxo radicals and/or cyclic hemiketal groupings according to step (f) were already mentioned for the subsequent modifications of the compounds of general Formula A.

Ketal groupings such as ethylene-dioxy groups can also be cleaved, e.g., by heating with the appropriate starting materials in mixtures of a small amount of hydrochloric acid with methanol and acetic acid to about 50° to 70°C.

Compounds of general Formula D can be produced from various known starting materials by reaction sequences which—with isolated exceptions—are known. Two examples of such reaction sequences are given below.

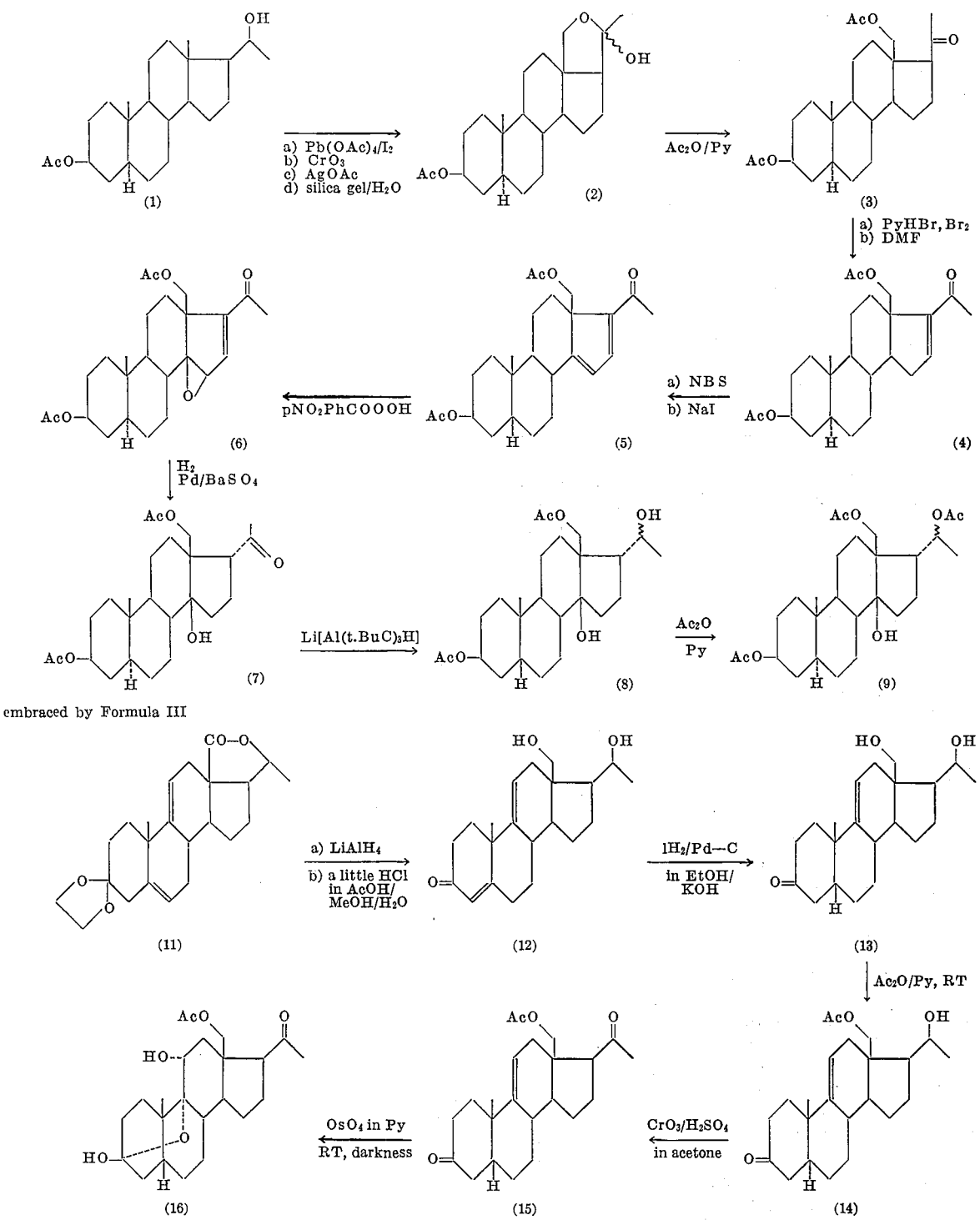

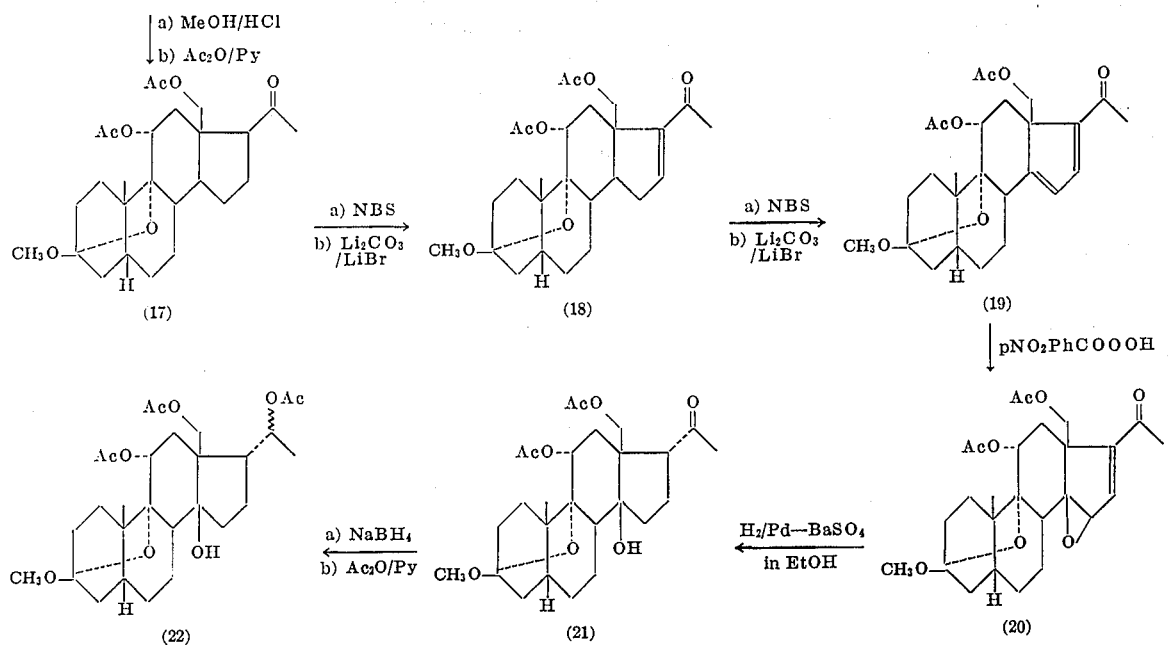

embraced by Formula III

According to the first reaction sequence, the starting compound is 3β-acetoxy-20β-hydroxy-5α-pregnane (1), which can be substituted as defined. Compounds of this type are described in the literature. By oxidation with lead tetraacetate in the presence of iodine in cyclohexane, and re-oxidation with $CrO_3$, and subsequent reaction with silver acetate followed by an aftertreatment with silica gel/water, is obtained 3β-acetoxy-18,20-oxido-20 ξ-hydroxy-5α-pregnane (2). Treatment of (2) with acetic anhydride/pyridine, at elevated temperature, yields 3β,18-diacetoxy-20-oxo-5α-pregnane (3), which can be converted by bromination with pyridinium hydrobromideperbromide and subsequent dehydrobromination with dimethyl formamide into 3-β,18-diacetoxy-20-oxo-$\Delta^{16}$-5α-pregnene (4). A repeated bromination with N-bromo-succinimide and dehydrobromination with sodium iodide in acetone yield 3β,18-diacetoxy-20-oxo-$\Delta^{14,16}$-5α-pregnadiene (5). Epoxidation with p-nitroperbenzoic acid yields 3-β,18-diacetoxy-14β,15β-epoxy-20-oxo-$\Delta^{16}$-5α-pregnene (6), which is converted by catalytic hydrogenation in ethanol, in the presence of palladium on barium sulphate, into 3β-18-diacetoxy-14β-hydroxy-20-oxo-5α,17α-pregnane (7). Reduction with lithium-aluminium-tritert butoxyhydride subsequently leads to 3β,18-diacetoxy-14β,20ξ-dihydroxy-5α,17α-pregnane (8), which can be acetylated to 3β,18,20ξ-triacetoxy-14β-hydroxy-5α,17α-pregnane (9). The latter is embraced by the general Formula III.

In the second reaction sequence, the starting compound, (20R)-3-ethylenedioxy-20-hydroxy-$\Delta^{5,9(11)}$-pregnadien-18-acid lactone-( → 20) (11), which is also known, is first reduced with lithium aluminium hydride to the 18,20-dihydroxy compound. The subsequent cleaving of the 3-ethylenedioxy group with a little hydrochloric acid in acetic acid/methanol leads to (20R)-3-oxo-18,20-dihydroxy-$\Delta^{4,9(11)}$-pregnadiene (12), which is hydrogenated with the calculated amount of hydrogen in the presence of a palladium/charcoal catalyst to (20R)-3-oxo-18,20-dihydroxy-$\Delta^{9(11)}$-5β-pregnene (13). partial acetylation thereof with acetanhydride/pyridine at room temperature leads to (20R)-3-oxo-18-acetoxy-20-hydroxy-$\Delta^{9(11)}$-5β-pregnene (14), which is oxidized with chromium trioxide/sulphuric acid in acetone to 3,20-dioxo-18-acetoxy-$\Delta^{9(11)}$-5β-pregnene (15). On treatment of the latter with osmium tetroxide in pyridine at room temperature and darkness, after several days there is surprisingly obtained 3β,11α-dihydroxy-3α,9α-epoxy-18-acetoxy-20-oxo-5β-pregnane (16). This is in contrast to the statement made by L. F. Fieser in "Steroids," Reinhold Publishing Corporation, New York, 1959, page 669, according to which $\Delta^{9(11)}$-5β-steroids cannot be reacted with osmium tetroxide.

The cyclic hemiketal (16) is first converted with methanolic hydrogen chloride to the ketal and then acetylated with acetanhydride/pyridine to obtain 3β-methoxy-3α,9α-epoxy-11α,18-diacetoxy-20-oxo-5β-pregnane (17). On bromination with N-bromo-succinimide in 17-position and cleaving hydrogen bromide by means of lithium carbonate/lithium bromide, 3β-methoxy-3α,9α-epoxy-11α,18-diacetoxy-20-oxo-$\Delta^{16}$-5β-pregnene(18) is obtained. Repetition of the two latter reactions yields 3β-methoxy-3α,9α-epoxy-11α,18-diacetoxy-20-oxo-$\Delta^{14,16}$-5β-pregnadiene (19). Treatment thereof with p-nitro-perbenzoic acid in chloroform/methanol leads to 3β-methoxy-3α,9α:14β,15β-diepoxy-11α,18-diacetoxy-20-oxo-$\Delta^{16}$-5β-pregnene (20), from which, by thorough hydrogenation in the presence of palladium/barium sulphate catalyst in ethanol, 3β-methoxy-3α,9α-epoxy-11α,18-diacetoxy-14β-hydroxy-20-oxo-5β,17α-pregnane (21) is obtained. This is finally converted by reduction with sodium boro-hydride in methanol/water and subsequent acetylation with acetanhydride/pyridine into 3β-methoxy-3α,9α-epoxy-11α,18,20ξ-triacetoxy-14β-hydroxy-5β,17α-pregnane (22), which is embraced by the general Formula III.

The above reaction sequences can also be performed analogously with compounds which instead of the 3-acetoxy or 3-ethylene-dioxy group have other protected hydroxyl groups or oxo radicals falling under the definition for $R_4$.

Analogous to the second reaction sequence, the starting materials having a protected functional group corresponding to the definition of $R_2'$ in 7-position can also be converted into compounds of general Formula D, whereby the functional group in 7-position can be left or can be used to introduce a double bond into the 7,8-position. It is, e.g., likewise possible to reintroduce a double bond into the 16,17-position analogously to the conversion of the compound (17) into the compound (18) in the second reaction sequence.

A particular performance of the above process directed especially to the preparation of compounds of the above reported formula I is characterized in that a compound of the formula (III)

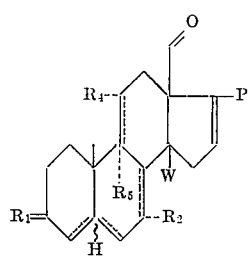

wherein $R_1$, $R_2$, $R_4$, $R_5$ and P have the meaning indicated for the formula I, and in which double bonds can be present in one of the positions 4,5 or 5,6 and/or where relevant, in the case that $R_2$ or $R_4$ denotes a H atom, also in one of the positions 7,8 and/or 9,11, and wherein W denotes an etherified hydroxyl group, is reacted with an aliphatic amine of the formula $R_3—NH_2$, wherein $R_3$ has the meaning indicated above for the formula I, or with ammonia, the resulting Schiff's base is reduced with an alkali metal borohydride or some other complex light metal hydride of lower basicity than the alkali metal borohydrides to give the corresponding amine, the latter is reacted with a halogenoacetic acid halide, the compounds thus obtained, of the partial formula (IV)

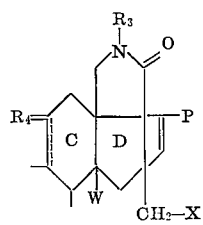

wherein $R_3$, $R_4$, P and W have the above meaning and X represents a halogen atom, are treated with a strong acid, whereby the group W is converted into the hydroxyl group, the resulting compounds are cyclised by treatment with a basic agent and, if desired, in resulting compounds of the formula (V)

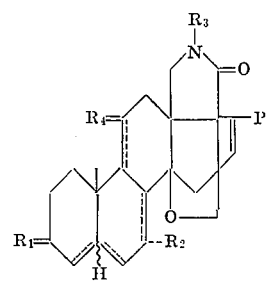

wherein $R_1 - R_4$ and P have the meaning indicated for the formula III and in which double bonds are optionally present, as in the case of the formula III, in optional sequence the lactam grouping is reduced to the corresponding amino group by means of a complex metal hydride and/or esterified hydroxyl groups or ether groups or protected oxo groups are liberated and/or free hydroxyl groups are esterified or etherified and/or a free hydroxyl group $R_2$ which is formed is split off, if appropriate after prior protection of further free hydroxyl groups which are present, so as to form a 7,8-double bond and/or a free hydroxyl group $R_4$ is dehydrogenated to the oxo group.

In the starting substances defined above, W is, for example, a hydroxyl group etherified with one of the alcohols particularly singled out above for the process products of the formula I. In particular, however, W is a hydroxyl group etherified by a 2-thiapropanol or 2-thiaarylethanol of one of the formulae

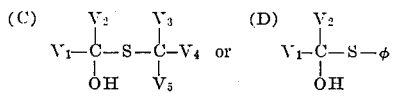

wherein $V_1 - V_5$ denote hydrogen or alkyl or aryl groups, especially lower alkyl groups and $\phi$ denotes an aryl group, especially an unsubstituted or substituted phenyl nucleus, above all the 2'-thiapropoxy group $—O—CH_2—S—CH_3$.

The reaction, according to the process, of the starting substances mentioned with the aliphatic amine of the formula $R_3—NH_2$ which has been mentioned can be carried out at low temperature, for example room temperature, or preferably at elevated temperature, for example between approx. 80° and 150°, preferably in an organic solvent, such as, for example, an aromatic hydrocarbon, such as benzene or toluene, or a chlorinated aromatic or aliphatic hydrocarbon, such as chlorobenzene or methylene chloride or ethylene chloride, or an alcohol, for example an aliphatic alcohol such as methanol or ethanol, isopropyl alcohol, propanol or butanol, and, depending on the boiling point of the amine used and of the solvent, if appropriate in a closed vessel under pressure and/or in the presence of a water-binding molecular sieve. The amine is preferably used in excess and can, if desired, also be reacted without solvents. If, in the reaction according to the process, an undesired splitting of acyloxy groups occurs as a result of aminolysis, these groups are again acylated in a subsequent step.

The reduction of the Schiff's base to the corresponding amine is preferably carried out with an alkali metal borohydride, especially with sodium borohydride, preferably at room temperature and the solvents used are advantageously lower alkanols, such as methanol or ethanol, if desired in the presence of water. It is however also possible to use complex light metal hydrides of lower basicity such as, for example the tri-tert.-lower alkoxy-lithium-aluminium hydrides, for example tri-tert.butoxy-lithium-aluminium hydride, and in that case the reaction is carried out in the solvents known for the reduction with these reducing agents.

The subsequent reaction of the resulting amine with a halogenoacetic acid halide, the splitting of the ether group W, the cyclisation of the derivatives which correspond to the compounds of the formula IV and have a free 14-hydroxyl group to give the compounds of the formula (V) and the remaining reactions which follow optionally, according to the process characterised above, can be carried out in a manner which is in itself known.

Thus, chloroacetic acid halides, especially chloroacetic acid chloride, are preferably used for the reaction of the resulting amine with a halogenoacetic acid halide, and the reaction is preferably carried out at room temperature, for example at approx. 0°–20° and in the presence of a hasid agent, such as an alkali metal hydroxide, for example sodium hydroxide in aqueous solution.

The cyclisation to give the compound of the formula V takes place in the presence of an acid-binding agent, preferably of a metal hydroxide, such as silver hydroxide, sodium hydroxide or potassium hydroxide, of basic metal salts, such as sodium carbonate or potassium carbonate or sodium bicarbonate or potassium bicarbonate, alkali metal alcoholates, such as, for example, sodium methylate, sodium ethylate or potassium tert.-butylate, or of a metal hydride, such as sodium hydride, calcium hydride or lithium aluminium hydride. The solvents used are preferably aliphatic, alicyclic or aromatic hydrocarbons, especially benzene or toluene, ethers, such as, for example, diethyl ether, tetrahydrofurane or dioxane, or dimethylsulphoxide, dimethylformamide and/or alcohols, such as, for example, methanol, ethanol or tert.butanol.

An advantageous embodiment of the cyclisation is the reaction of the starting substances with sodium hydride in a mixture, preferably a 1:1 mixture, of benzene and tetrahydrofurane, in the presence of catalytic amounts of an alcohol, especially methanol or ethanol.

The splitting of the ether group W in the compounds of the formula IV to form the free 14-hydroxyl group takes place by means of a strong acid in a manner which is in itself known, for example by means of hydrochloric acid or of another mineral acid, such as perchloric acid, or by means of a sulphonic acid, such as p-toluenesulphonic acid or methanesulphonic acid. If the group W is an ether group originating from one of the abovementioned sulphur-containing alcohols, such as the methyl-thio-methoxy group, hydrogen chloride in an alcohol, such as methanol at room temperature, is preferably used or chloramine-water.

If desired, the compounds of the formula V are treated with a complex metal hydride to reduce the lactam group, in accordance with the characterised process of the present application. For this purpose, a light metal hydride, such as an alkali aluminium hydride, especially sodium aluminium hydride or lithium aluminium hydride, is used particularly. Solvents used for such reductions are the customary solvents such as, for example, an ether, for example diethyl ether, tetrahydrofurane or dioxane. Esterified hydroxyl groups are liberated during this reduction when using, for example, alkali aluminium hydrides, and can subsequently be formed again by acylation.

The optional liberation of protected oxo and/or hydroxyl groups takes place in a manner which is in itself known; for example, ketalised oxo groups or etherified hydroxyl groups are liberated by acid treatment, for example with acetic acid, perchloric acid or a mineral acid, whilst esterified hydroxyl groups are liberated by means of alkaline agents, for example, alkali metal hydroxides, carbonates or bicarbonates, or by the light metal hydrides of the type of lithium aluminium hydride which have been mentioned.

The splitting of ketal groups is preferably carried out under mild acid conditions, for example with mixtures of 70% strength aqueous perchloric acid and acetic acid at room temperature or p-toluenesulphonic acid in acetone at the boil. Under these conditions, an alkoxy group present in the 3-position together with a 3,9-epoxy radical is, in particular, also converted into the hydroxyl group.

The acylation of free hydroxyl groups can also be carried out in a manner which is in itself known. For example, compounds obtained, which contain such functional groups, are treated with an acid halide, especially an acid chloride, or an acid anhydride, in the presence of a tertiary base, such as pyridine or collidine. The etherification is brought about by treatment with the desired alcohol in the presence of an acid agent or advantageously with a reactive functional derivative of such an alcohol, such as an alkyl halide or alkyl sulphate or dialkyl sulphate, in the presence of a basic agent, for example of an alkali metal hydroxide.

A hydroxyl group present in the 7-position can, if desired, be split off to form a double bond in the 7,8-position. This dehydration takes place in a manner which is in itself known, for example by treatment with an acid halide in the presence of a tertiary base. The use of thionyl chloride and pyridine is particularly suitable and the reaction is preferably carried out at room temperature. If free hydroxyl groups are present in other positions such as, for example, in the 11-position and/or 20-position, they are protected by selective acylation before the dehydration mentioned. This can be achieved, for example, by maintaining mild conditions during the acylation.

Finally, an 11-hydroxyl group is dehydrogenated to the oxo group, if desired, and this can be achieved, for example, by the Oppenauer method or by treatment with compounds of hexavalent chromium, for example, chromium trioxide in pyridine.

The reactions to be carried out optionally, which have been described, can be carried out in optional sequence, after obtaining the compounds of the formula V.

If desired, the liberation of the 14-hydroxyl group can also be carried out before the reaction of the amine, obtained by alkali borohydride reduction, with a halogenoacetic acid halide, or before the reduction.

A preferred sequence is first to carry out the reduction of the lactam group and to liberate etherified and/or esterified hydroxyl groups, optionally after prior dehydrogenation of an 11-hydroxyl group to the oxo group, and, if desired, to esterify and/or etherify free hydroxyl groups. [Reaction sequence A].

In another preferred embodiment of the process, compounds of the formula V which possess an esterified hydroxyl group in the 7-position are treated with non-reducing alkaline agents so that all esterified hydroxyl groups present are liberated, then the free hydroxyl groups present, except for the 7-hydroxyl group, are selectively acylated as described above, thereafter the 7-hydroxyl group is split off to form the 7,8-double bond, then the lactam group is reduced to the amine group and, if desired, esterified or etherified hydroxyl groups are liberated and/or free hydroxyl groups are esterified and/or etherified. (Reaction sequence B).

Another variant ($B_1$), for the preparation of compounds with a 7,8-double bond uses the following sequence: Reduction of the lactam group (as in reaction sequence A) to the amine group, so that all esterified hydroxyl groups are liberated, selective acylation of all hydroxyl groups, apart from the 7-hydroxyl group which is more difficult to esterify, and splitting off the 7-hydroxyl group, as in sequence B, and liberation of esterified or etherified hydroxyl groups or esterification or etherification of free hydroxyl groups, again as in sequence B.

Preferably, those starting substances of the formula III are used which possess, in the rings A, B and C and in the side chain P, the substituents specified above for the formula I or II, and in which W denotes a hydroxyl group etherified with a 2-thiapropanol of the above formula (c), having to 8 C atoms, especially the 2-thiapropoxy group (or methyl-thio-methoxy group).

For the manufacture of the alkaloids batrachotoxinin A and epibatrachotoxinin A which have been mentioned, and of their 7,8-dihydro derivatives, the compounds of the following formulae are of great interest as starting substances:

pounds of the above formula V, the lactam group is then reduced and, if desired, the etherified hydroxyl group in the 3-position and/or esterified hydroxyl groups are liberated and/or free hydroxyl groups are esterified and/or etherified. Above all, the starting substances used are compounds in which W represents the 2-thiapropoxy group, R' the methyl group and Ac acetyl groups. In the reduction of the lactam group to the amine group, all esterified hydroxyl groups are as a rule liberated. The etherified hydroxyl group R'O— in the 3-position is, for example, converted into the free hydroxyl group in a manner which is in itself known, by warming with an acid agent, such as, for example, by means of p-toluenesulphonic acid in a suitable solvent, such as a ketone or an alcohol, optionally in the presence of water, for example in acetone-water. If desired, the compounds thus obtained, 7,8-dihydrobatrachotoxinin A and 7,8-dihydro-epibatrachotoxinin A, can be converted into their esters or ethers, especially into the 20-monoesters, for example those which are derived from the abovementioned pyrrolecarboxylic acids. This selective esterification in the 20-position takes place according to methods which are in themselves known, as described, for example, in German Offenlegungsschrift 2,029,169. Furthermore, diesters and triesters and mixed ester-ethers can be manufactured.

The manufacture of batrachotoxinin A and epibatrachotoxinin A, on the other hand, is preferably carried out starting from compounds of the above formula VI and VII, by use of the above reaction sequences B or $B_1$. One variant of the process of this invention for the manufacture of these compounds and their esters and (VI) (VII)

in which W has the meaning indicated in the preceding section, R' denotes a lower alkyl group with 1–6 C atoms, and R" denotes two hydrogen atoms or the $$\diagup^{OAc}_{H}$$

group, and wherein Ac are acyl groups, especially lower aliphatic acyl groups with 1–6 C atoms, above all acetyl radicals. W is preferably a hydroxyl group etherified with 2-thiapropanol, and R' is preferably a methyl group.

The manufacture of 7,8-dihydrobatrachotoxinin A and 7,8-dihydro-epibatrachotoxinin A and their esters and ethers is carried out, for example, from starting compounds of the formulae VI and VII by using the reaction sequence A characterised above. Such an embodiment of the process according to the present application is characterised in that a compound of the formula VI or VII, in which R" denotes two hydrogen atoms and the remaining substituents have the abovementioned meaning, is converted according to the general process described into the corresponding comethers is characterised in that a compound of the formula VI or VII, in which R" denotes the $$\diagup^{OAc}_{H}$$

group and the remaining substituents have the meaning indicated for these formulae, is converted according to the general process described into the corresponding compounds according to the above formula V, in these the esterified hydroxyl groups are liberated by alkaline treatment with agents which do not reduce the lactam group, the 11- and 20-hydroxyl groups are selectively converted into esterified hydroxyl groups by acylation under mild conditions, the 7-hydroxyl group is split off by treatment with a dehydrating agent, so as to form the 7,8-double bond, the lactam group is then reduced to the amine group and, if desired, the etherified hydroxyl group in the 3-position and/or esterified hydroxyl groups are liberated and/or free hydroxyl groups are esterified and/or etherified.

The individual steps are carried out as described above.

The liberation of the esterified hydroxyl groups in compounds corresponding to the formula V is preferably carried out with alkaline hydrolysing agents, such as alkali metal hydroxides, carbonates or bicarbonates.

The reacylation of the 11- and 20-hydroxyl groups takes place under mild conditions, for example by treatment with a carboxylic acid anhydride at room temperature in the presence of a tertiary base, such as pyridine. The variant just discussed can also be modified in the sense of reaction sequence $B_1$, that is to say the compounds corresponding to the formula V are treated with a complex metal hydride of the type of lithium aluminium hydride so that simultaneously the lactam group is reduced to the amine group and the esterified hydroxyl groups are liberated. This is followed by selective esterification of the hydroxyl groups in the 11- and 20-position, dehydration in the 7-position and liberation of esterified and/or etherified hydroxyl groups and/or functional modification of free hydroxyl groups obtained.

In the resulting batrachotoxinin A or epibatrachotoxinin A the free hydroxyl groups can be converted wholly or partially into esterified or etherified hydroxyl groups. Here again, the compounds of outstanding interest are the 20-monoesters and especially those which are derived from the abovementioned pyrrolecarboxylic acids, especially the known batrachotoxin and its 20-epimer. Further, in this case again diesters and triesters, as well as mixed ester-ethers, can be manufactured.

The starting substances used can be manufactured according to the process of U.S. Pat. application Ser. No. 364,466, filed May 29, 1973. This process consists of treating a 14,18-ketal of 14,18-steroid-diols of the formula (VIII)

wherein $R_1$, $R_2$, $R_4$ and $R_5$ have the meaning indicated for the formula I and in which double bonds can be present in one of positions 4,5 or 5,6 and/or optionally, in the case that $R_2$ or $R_4$ denotes a H atom, also in one of positions 7,8 and/or 9,11, with a complex metal hydride which reduces an oxo group to the hydroxyl group but leaves esterified hydroxyl groups intact, at least one of the resulting 20 S or 20 R steroid-alcohols is isolated from the reaction mixture, the 20-hydroxyl group is acylated, the ketal group is split and in resulting 14,18-diols the 18-hydroxyl group is selectively dehydrogenated to the oxo group, the 14-hydroxyl group is etherified and, if desired, in the 18-aldehydes thus obtained esterified hydroxyl groups or protected oxo groups are liberated and/or free hydroxyl groups are esterified or etherified or free oxo groups are protected. A particularly suitable method for the selective dehydrogenation of the 18-hydroxyl group to the 18-oxo group is the method of Albright and Goldmann, according to which the 14,18-diols are treated with a mixture of an organic sulphoxide of one of the formulae wherein $V_1 - V_5$ denotes hydrogen or alkyl or aryl groups, especially lower alkyl groups, and $\phi$ denotes an aryl group, especially an unsubstituted or substituted phenyl nucleus, and of a carboxylic acid. Hereupon, in addition to the desired conversion of the 18-hydroxyl group into the aldehyde group, the 14-hydroxyl group is etherified with the 2-thiapropanols of the formulae which are isomeric with the sulphoxides mentioned. Dimethylsulphoxide and acetic anhydride or homologues of the above compounds are in particular used. A 14-ether group formed in this way can, if desired, be converted into the free 14-hydroxyl group and the latter can then be etherified with any other desired alcohol. This process is illustrated, for a specific case, by the following reaction scheme:

has been mentioned, of a carboxylic acid anhydride and a dialkylsulphoxide, for example acetic anhydride and dimethylsulphoxide, yields the desired starting substances according to the formula VI or VII.

The abovementioned compounds of the formula VIII can be prepared according to methods which have been published; compare, for example, Helvetica Chim. Acta, volume 54 (1971), pages 2,785 – 2,788. Thus, for example, the starting substance of the formula which is of decisive importance for the preparation of batrachotoxinin, can be manufactured according to the following reaction scheme:

In these equations, Ac denotes lower aliphatic acyl groups, Alk denotes a lower aliphatic alkyl group and $W_1$ and $W_2$ also denote lower alkyl groups. In this case, after the reduction with sodium borohydride, which preferentially yields the 20 S-epimer, this compound is isolated and further processed as described. Others of the abovementioned complex light metal hydrides, such as, for example, tri-tert.-butoxy-lithium aluminium hydride or tri-tert.-amyloxy-lithium aluminium hydride, preferentially yield the 20 R-epimer and in the case that it is desired to employ starting substances of this configuration in accordance with the process of the patent application, these hydrides are advantageously employed. The acylation of the 20-hydroxyl group takes place by treatment with an acid anhydride in a manner which is in itself known, for example by treatment with acetic anhydride and pyridine at room temperature. The splitting of the 14,18-ketal group can be achieved under mild conditions, for example by treatment with catalytic amounts of p-toluenesulphonic acid. The treatment of the 14,18-diols with a 20-acyloxy group, thus obtained, with the mixture, which The lactone 1 can be converted into the compound 2 according to the instructions in Helv. 54, 2,795 (1971). This compound is acetylated under drastic conditions and the triacetyl derivative 3 is converted in 2 steps, by bromination and dehydrobromination, using bromosuccinimide, via the enone 4 into the dienone 5. The latter can be oxidised to the 14,15-oxido derivative 6 by treatment with p-nitroperbenzoic acid. Catalytic hydrogen transfer by means of cyclohexane-palladium on barium sulphate, yields the product 7, which is hydrolysed to the 14,18-diol 8. The manufacture of the ketals of such 14,18-diols is carried out with a ketone in a manner which is in itself known or with a lower aliphatic ketal of such a ketone, for example with dimethoxypropane in the presence of p-toluenesulphonic acid.

In principle, the other compounds of the formula VIII can also be manufactured according to this reaction scheme.

The invention also relates to those embodiments of the process described above in which a compound obtainable as an intermediate product at any stage is used as the starting point and the missing process steps are carried out, or the starting substances are formed under the reaction conditions.

The invention furthermore also relates to pharmaceutical preparations which contain the substances of the formulae I and II described above as being pharmacologically active and the further compounds discussed in detail and falling under these formulae, together with a pharmaceutical excipient. Possible excipients are substances which do not react with the new compounds such as, for example, water, gelatine, lactose, starch, magnesium stearate, talc, vegetable oils, benzyl alcohols, gum, polyalkylene glycols, white petroleum jelly, cholesterol and other known medicinal excipients. The pharmaceutical preparations can be in a solid form, for example as tablets, dragees or capsules, or in a liquid or semi-liquid form as solutions, suspensions, emulsions, ointments or creams. These pharmaceutical preparations are optionally sterilised and/or contain auxiliaries, such as preservatives, stabilisers, wetting agents or emulsifiers, salts for regulating the osmotic pressure or buffers. They can also contain yet other therapeutically valuable substances. The new compounds can also serve as starting products for the manufacture of other valuable compounds.

The compounds of the present application can also be used as fodder additives.

The invention is described in the examples which follow. The optical rotations are measured in chloroform (temperature 22°C), the IR-spectra data are given as wave numbers ($cm^{-1}$), the measurement again being carried out in chloroform, and the UV-spectral data relate to measurement in ethanol, the figures quoted in each case showing the wavelength $\lambda_{max}$, expressed in nanometres, corresponding to the maximum absorption, and the extinction coefficients $\epsilon$.

Unless expressly noted otherwise, "working up" of a reaction mixture obtained denotes taking up the reaction mixture in ethyl acetate, washing with water or saturated sodium chloride solution until the neutral point is reached, drying over magnesium sulphate and evaporation in a rotary evaporator. Unless otherwise noted, chromatography implies the use of 0.05–0.2 mm highest purity silica gel from Merck.

Unless otherwise noted, "crystallisation" or "crystallising" denotes dissolving and separating out again, using acetone-hexane or ether-hexane.

EXAMPLE 1

220 mg of (20S)-3β-methoxy-3α,9α-oxido-7α,11α,20-triacetoxy-14β-methyl-thiomethoxy-18-oxo-$\Delta^{16}$-5β-pregnene are dissolved in 4 ml of absolute benzene and warmed, together with 1.5 ml of a saturated solution of methylamine in benzene, for 9 hours to 85°C in a bomb tube. The mixture is then cooled and evaporated in vacuo. This yields 220 mg of (20S)-3β-methoxy-3α,9α-oxido-7α,11α,20-triacetoxy-14β-methyl-thiomethoxy-18-methylimino-$\Delta^{16}$-5β-pregnene (IR: 2,770, 1,730, 1,665 and 1,240), which are reduced, without purification, in 18 ml of methanol, at room temperature, with 220 mg of $NaBH_4$ in 2 ml of water, over the course of 10 minutes. The mixture is then diluted with ethyl acetate, washed with saturated aqueous NaCl solution until neutral, dried over $MgSO_4$ and evaporated in vacuo. This yields 210 mg of (20S)-3β-methoxy-3α,9α-oxido-7α,11α,20-triacetoxy-14β0-methyl-thiomethoxy-18-methylamino-$\Delta^{16}$-5β-pregnene (IR: 3,340, 2,800, 1,730 and 1,240), which are again treated successively, without purification, in 20 ml of alcohol-free chloroform, at 0°C, with 1.5 ml of chloroacetyl chloride and 0.28 g of NaOH in 20 ml of water. The two-phase system is then left for 15 minutes at 0°C whilst stirring vigorously and is subsequently poured onto saturated aqueous $NaHCO_3$ solution, the mixture is extracted with ethyl acetate and the extract is washed with saturated aqueous NaCl solution until it is neutral. After drying and subsequent evaporation of the organic phase, 220 mg of (20S)-3β-methoxy-3α,9α-oxido-7α,11α,20-triacetoxy-14β-methyl-thiomethoxy-18-(N-methyl-N-chloroacetyl-amino)-$\Delta^{16}$-5β-pregnene are obtained, which are left, without prior purification and characterisation, for 1 ¾ hours at room temperature in 10 ml of an 0.05 N HCl solution in absolute methanol. This mixture is then poured into aqueous $NaHCO_3$ solution, the mixture is extracted with ethyl acetate and the extract is washed with saturated aqueous NaCl solution until neutral. The crude product obtained after drying and evaporation of the organic phase is finally chromatographed, in benzene-ethyl acetate (1:1) solution on silica gel. This yields 150 mg of crystals of (20S)-3β-methoxy-3α,9α-oxido-7α,11α,20-triacetoxy-14β-hydroxy-18-(N-methyl-N-chloroacetyl-amino)-$\Delta^{16}$-5β-pregnene, the melting point of which after one crystallisation is 203°–204°C. $[\alpha]_D = +39°$ (0.40). IR: 3,350 (broad), 1,730, 1,645 and 1,245.

170 mg of NaH dispersion are freed of adhering mineral oil by washing four times with absolute pentane. The material is then covered with 5 ml of absolute benzene and 80 mg of (20S)-3β-methoxy-3α,9α-oxido-7α,11α,20-triacetoxy-14β-hydroxy-18-(N-methyl-N-chloroacetyl-amino)-$\Delta^{16}$-5α-pregnene in 5 ml of absolute tetrahydrofurane are added under argon. Finally, one drop of a solution of 20 mg of ethanol in 10 ml of absolute benzene is also added and the mixture is boiled under argon, and whilst stirring, for 2 hours. 0.4 ml of methanol is then added and the mixture is boiled for a further hour in order to hydrolyse the acetate groupings on C-7, C-11 and C-20. It is then poured onto saturated aqueous $(NH_4)_2SO_4$ solution, the mixture is extracted with ethyl acetate, and the organic phase is washed with saturated aqueous NaCl solution until neutral, dried and evaporated in vacuo. This yields 50 mg of crude (20S)-3β-methoxy-3α,9α-oxido-7α,11α,20-trihydroxy-14β0,18N-[ep(oxy-2'-oxo-ethano)-N-methylimino)]-$\Delta^{16}$-5β-pregnene (IR: 3,500 (broad) and 1,635), which are acetylated, without purification, in 4 ml of acetic anhydride-pyridine (1:1) mixture overnight at room temperature. The whole is then evaporated in vacuo and the residue is chromatographed in ethyl acetate-methanol (9:1) solution. This yields 47 mg of crystals of (20S)-3β-methoxy-3α,9α-oxido-7α-hydroxy-11α,20-diacetoxy-14β0,18N-[ep(oxy-(2'-oxoethano)-N-methylimino)]-$\Delta^{16}$-5β-pregnene, which melt at 254°–255°C after one crystallisation. $[\alpha]_D = +114°$ (0.40). IR: 3,510, 2,860, 2,840, 1,730, 1.635 and 1,240.

30 mg of the product thus obtained, in 0.9 ml of absolute pyridine and 0.02 ml of $SOCl_2$, are left for 2 hours at room temperature. The mixture is then poured into aqueous $NaHCO_3$ solution and extracted with ethyl acetate, and the extract is washed with saturated aqueous NaCl solution until neutral. The crude product which arises after drying and evaporation of the organic phase is purified by means of preparative thin layer chromatography, in ethyl acetate as the migrating agent system. This yields 15 mg of (20S)-3β-methoxy-3α,9α-oxido-11α,20-diacetoxy-14β0,18N-ep[(oxy-(2'-oxo-ethano)-N-methylimino)]-Δ$^{7,16}$-5β-pregnadiene in the amorphous form, which according to thin layer chromatography is a single substance. IR: 2,840, 1,730, 1,650 and 1,635 (double band) and 1,250.

19 mg of this product in 3 ml of absolute ether are boiled for 5 hours with 40 mg of LiAlH$_4$. The excess hydride is then destroyed by carefully adding saturated aqueous (NH$_4$)$_2$SO$_4$ solution and the mixture is subsequently poured into 5 per cent strength aqueous NH$_3$ solution. It is then extracted with ethyl acetate and the organic phase is washed with saturated aqueous NaCl solution until neutral, dried and evaporated in vacuo. The resulting crude product is purified by means of preparative thin layer chromatography in the system cyclohexane-chloroform-triethylamine-methanol (16:4:1:1). This yields 10 mg of (20S)-3β-methoxy-3α,9α-oxido-11α,20-dihydroxy-14β0,18N-[epoxyethano-N-methylimino)]-Δ$^{7,16}$-5β-pregnadiene, which is a single substance, in the amorphous form. IR: 3,340, 2,840, 1,100 and 990. After 2 crystallisations from ether-hexane, the product melts at 106°–107°C. $[\alpha]_d = -33°$ (0.60).

10 mg of this product in 1.5 ml of 90 per cent strength aqueous acetone are boiled with 1.5 mg of p-toluene-sulphonic acid for 1 hour. The mixture is then added to dilute aqueous 5 per cent strength NH$_3$ solution and extracted with ethyl acetate, and the extract is washed with saturated aqueous NaCl solution until neutral. The crude batrachotoxinin A resulting after drying and evaporation of the organic phase is preparatively purified on thin layer plates in the system cyclohexane-chloroform-triethylamine-methanol (16:4:1:1). This yields 5 mg of batrachotoxinin A in the amorphous form, which proves identical with natural batrachotoxinin A according to a thin layer chromatogram in the systems cyclohexane-chloroform-triethylamine-methanol (16:4:1:1 or 16:4:1:2) and ethyl acetate-methanol (4:1) and according to the IR spectrum, mass spectrum and NMR spectrum.

Batrachotoxinin can be obtained as follows, in a crystalline form, from the 3β-methoxy-3α,9α-oxido-11α,20-dihydroxy-14β0,18N-[ep(oxyethano-N-methylimino)]-Δ$^{7,16}$-5β-pregnadiene which has been mentioned: 23 mg of the compound just mentioned are boiled for 1 hour with 12 mg of p-toluenesulphonic acid in 3 ml of 90 per cent strength aqueous acetone. The mixture is diluted with ethyl acetate, added to 5 per cent strength aqueous ammonia solution and worked up as above. After thin layer chromatography as described above, 14 mg of batrachotoxinin A are obtained, melting at 160°–162°C after crystallisation from hexane-ether. $[\alpha]_D = -42°$ (0.45). IR: 3,580 and 3,350 (broad).

[The NMR spectrum of natural batrachotoxinin A published by Witkop (Journal of the American Chemical Society 91, 3,931 (1969)) is the spectrum of the corresponding deuterochloride which has been produced, prior to the NMR recording, in deuterochloroform contaminated by deuterohydrochloric acid. Apart from this, various signal allocations additionally had to be changed. The NMR values for synthetic and natural batrachotoxinin A are: NMR.: 0.88/s CH$_3$-19, 1.40/d/J = 7 CH$_3$-21, 2.30–2.80/div. bm CH$_2$ = 2', 2.32 + 3.21/2d/J$_{15,15}$ = 19, (additional fine structure due to J$_{15,16}$ = 3 or 2) CH$_2$ = 15 (on irradiation with the frequency of the olefin proton CH–16 the two additionally resolved doublets are simplified to two doublets with J$_{15,15}$ = 19). 2.35/s NCH$_3$, 2.71/s CH$_2$-18, 3.78/d/J$_{11,12\alpha}$ = 9 (additional fine structure due to J$_{11,12\beta}$=4), CH-11, 3.55+4.05/2m CH$_2$-1', 4.46/q/J = 7 CH-20 (on irradiation with the frequency of CH$_3$-21, the signal simplifies to a singlet), 5.66/m CH-16, 6.24d/J$_{6\beta,7}$=6 (additional fine structure due to J$_{6\alpha,7}$ = 2) CH-7 [CDCl$_3$ + D$_2$O]. ]

MS (mass spectrum) M$^+$ = 417 (3.5%), 330 (100%).

The fact that the batrachotoxinin A obtained above is identical with natural batrachotoxinin A is proved, in addition to the NMR spectrum, also by the IR spectrum, mass spectrum and thin layer chromatograms in the systems ethyl acetate-methanol (4:1) and cyclohexane-chloroform-triethylamine-methanol (16:4:1:1).

2 mg of natural batrachotoxinin A are left in 0.5 ml of 0.1 N methanolic hydrochloric acid for 30 minutes at room temperature. The mixture is then added to a saturated aqueous sodium bicarbonate solution and worked up in the usual manner. The resulting crude product is purified by means of preparative thin layer chromatography in the migrating agent system cyclohexane-chloroform-triethylamine-methanol (16:4:1:1) and the crystals thereby obtained are recrystallised once from ether-hexane. The product proves identical with 3β-methoxy-3α,9α-oxido-11α,20-dihydroxy-14β0, 18N-[ep(oxyethano-N-methylimino)]-Δ$^{7,16}$-5β-pregnadiene, described above, according to mixed melting point, mass spectrum and thin layer chromatograms in the systems cyclohexane-chloroformtriethylaminemethanol (16:4:1:1), benzene-chloroformtriethylamine-methanol (16:4:1:1) and ethyl acetate-methanol (4:1).

EXAMPLE 2

200 mg of (20R)-3β-methoxy-3α,9α-oxido-11α,20-diacetoxy-14β-methyl-thiomethoxy-18-oxo-Δ$^{16}$-5β-pregnene in 4 ml of absolute benzene are warmed with 2 ml of saturated methylamine solution in benzene for 7 hours to 80°C in a bomb tube. The mixture is then cooled and evaporated in vacuo. The resulting 205 mg of the crude Schiff's base of the aldehyde employed, in 15 ml of methanol, are reduced with 200 mg of sodium borohydride in 1 ml of water for 10 minutes at 15°C. The mixture is then worked up and the resulting amine (200 mg) is dissolved in 20 ml of alcohol-free chloroform. 1.5 ml of chloroacetyl chloride and 140 mg of sodium hydroxide in 20 ml of water are added to this solution at 0°C, with vigorous stirring. After 15 minutes the mixture is worked up. This yields 250 mg of crude 3β-methoxy-3α,9α-oxido-11α, 20-diacetoxy14β-methyl-thiomethoxy-18-(N-methyl-N-chloroacetyl-amino)-Δ$^{16}$-5β-pregnene, which is again left, without purification, for 2 hours at room temperature in 20 ml of 0.05 N absolute HCl in methanol. Working up again, and chromatography in benzene-ethyl acetate (1:1) solution, finally yields 80 mg of crystalline (20R)-3β-methoxy-3α,9α-oxido-11α,20-diacetoxy-14β-hydroxy-18-(N-methyl-N-chloroacetyl-amino)-Δ$^{16}$-5β-pregnene, which after purification by crystallisation has a melting point of 176°–178°C, optical rotation $[\alpha]_D$ = +35° (0.29) and IR bands 3,350 (broad), 1,725, 1,640 and 1,245, and which is identical with the compound described in Helvetica Chimica Acta 54, page 2,793, (1971) and referred to as 3β-methoxy-3α,9α-oxido-11α,20ξ-diacetoxy-14β-hydroxy-18-(N-methyl-N-chloroacetyl-amino)-Δ¹⁶-5β-pregnene.

The conversion of this product, according to the instructions in Helv. Chimica Acta, loc. cit., into the compound described there as 3-0-methyl-20ξ-7,8-dihydrobatrachotoxinin yields the 20R-epimer of 3-0-methyl-7,8-dihydroepi-batrachotoxinin A, from which 7,8-dihydro-epibatrachotoxinin A is obtained by saponification of the etherified hydroxyl group in the 3-position in a manner which is in itself known.

EXAMPLE 3

(20S)-3β-Methoxy-3α,9α-oxido-11α,20-diacetoxy-14β-methyl-thiometoxy-18-oxo-Δ¹⁶-5β-pregnene is converted according to the instructions reproduced in the preceding example into (20S)-3β-methoxy-3α,9α-oxido-11α,20-diacetoxy-14α-hydroxy-18-(N-methyl-N-chloroacetyl-amino)-Δ¹⁶-5β-pregnene), 213 mg of this amorphous compound being obtained by chromatography in benzene-ethyl acetate (1:1) solution. IR: 3,450 (broad), 1,725, 1,645 and 1,250.

320 mg of NaH dispersion are freed of the adhering mineral oil by washing four times with absolute pentane. The product is then covered with 10 ml of absolute benzene and 228 mg of the above chloroacetate in 10 ml of absolute tetrahydrofurane are added under argon. Finally, one drop of a solution of 20 mg of ethanol in 10 ml of absolute benzene is also added and the mixture is boiled under argon, and whilst stirring, for 6 hours. It is then cooled to 0°C and the excess hydride is carefully decomposed with saturated aqueous $(NH_4)_2SO_4$ solution. Customary working up and chromatography in ethyl acetate finally yield 156 mg of crystals of (20S)-3β-methoxy-3α,9α-oxido-11α,20-diacetoxy-14β0,18N-[ep(oxy-(2'-oxoethano)-N-methylimino)]-Δ¹⁶-5β-pregnene. Melting point after crystallisation 166°–168°C. $[\alpha]_D = +12°$ (1.14). IR: 1,730, 1,634 and 1,250.

40 mg of the resulting compound are now reduced for 5 hours with 100 mg of $LiAlH_4$ in 10 ml of boiling absolute ether. After destroying the excess hydride by careful addition of saturated aqueous $(NH_4)_2SO_4$ solution, the mixture is added to 5 per cent strength aqueous $NH_3$ solution and worked up in the usual manner. Preparative thin layer separation in the system cyclohexane-chloroform-triethylaminemethanol (16:4:1:1) yields 30 mg of crystals of (20S)-3β-methoxy-3α,9α-oxido-11α,20-dihydroxy-14β0,18N-[ep(oxyethano-N-methylimo)]-Δ¹⁶-5β-pregnene. Melting point, after one crystallisation, 151°–152°C. $[\alpha]_D = +57°$ (0.33). IR: 3,600, 3,450 (broad), 2,810, 1,105, 1,000 and 960.

36 mg of the compound thus obtained are boiled with 28 mg of p-toluenesulphonic acid in a mixture of 7 ml of acetone and 0.7 ml of water for 1 hour. The mixture is then added to 5 per cent strength aqueous $NH_3$ solution and worked up in the usual manner. Preparative thin layer chromatography of the crude product in the system cyclohexanechloroform-triethylamine-methanol (16:4:1:3) yields 31 mg of crystals of (20S)-3β-hydroxy-3α,9α-oxido-11α,20-dihydroxy-14β0,18N-[ep(oxyethano-N-methylimino)]-Δ¹⁶-5β-pregnene (= 7,8-dihydrobatrachotoxinin A) which when recrystallised once melt at 169°–170°C. $[\alpha]_D = +57°$ (0.64), IR: 3,580, 3,400 (broad), 2,810, 1,100, 1,080, 1,065, 1,030, 1,010, 1,000, 960, 925 and 855.

EXAMPLE 4

The starting substance used in Example 1 can be obtained as follows:

720 mg of 3β-methoxy-3α,9α-oxido-7α-hydroxy-11α,18-diacetoxy-20-oxo-5β-pregnane [Helv. 54, 2,879 (1971)] are acetylated for 6 hours at 130°C in 30 ml of acetic anhydridepyridine (1:1) mixture under a $N_2$ atmosphere. The mixture is then evaporated in vacuo and chromatographed, in ethyl acetate-chloroform (1:1) solution, on silica gel. This yields 470 mg of 3β-methoxy-3α,9α-oxido-7α,11α,18-triacetoxy-20-oxo-5β-pregnane, which melt at 146°–147°C after one recrystallisation. $[\alpha]_D = +81°$ (0.64). IR: 1,735, 1,710 and 1,245.

Substantially the same result is also obtained if 4.8 g of the same starting substance are treated with 150 ml of the same acetylation mixture for 20 hours at 105°C.

470 mg of 3β-methoxy-3α,9α-oxido-7α,11α,18-triacetoxy-20-oxo-5β-pregnane in 40 ml of $CCl_4$ are boiled for 45 minutes with 200 mg of N-bromosuccinimide, with addition of 10 mg of azobisisobutyronitrile, whilst externally irradiating the mixture with a 1,000 W incandescent lamp. The succinimide which has precipitated in then filtered off and the filtrate is evaporated in vacuo. The resulting crude bromination product is dissolved in 40 ml of absolute dimethylformamide and warmed, with 470 mg of LiBr and 470 mg of $Li_2CO_3$, for b 2½ hours to 130°C under $N_2$. The whole is then concentrated in vacuo, diluted with ethyl acetate and repeatedly washed with water. The crude product resulting after drying and evaporation of the organic phase is chromatographed, in an ethyl acetate-chloroform (1:1) mixture, on silica gel. This yields 265 mg of crystals of 3β-methoxy-3α,9α-oxido-7α,11α-18-triacetoxy-20-oxo-Δ¹⁶-5β-pregnene, which when recrystallised once melt at 187°–188°C. $[\alpha]_D = +53°$ (0.54). IR: 1,730, 1,670, 1,595 and 1,240; UV: 235 (8,550).

265 mg of the product thus obtained and 110 mg of N-bromosuccinimide and 10 mg of azobisisobutyronitrile are boiled in 40 ml of $CCl_4$ for 20 minutes whilst irradiating the mixture externally with a 1,000 W incandescent lamp. The mixutre is then cooled, the succinimide which has precipitated is filtered off and the filtrate is evaporated in vacuo. The crude bromination product is warmed for 15 minutes with 265 mg of LiBr and 265 mg of $Li_2CO_3$ in 20 ml of absolute dimethylformamide to 130°C under $N_2$. The whole is then evaporated in vacuo, the residue is taken up in ethyl acetate and the solution is repeatedly washed with water. The crude product which is obtained after evaporation in vacuo is chromatographed, in benzene-ethyl acetate (1:1) solution, on silica gel. This yields 185 mg of crystals of 3β-methoxy-3α,9α-oxido-7α,11α,18-triacetoxy-20-oxo-Δ¹⁴,¹⁶-5β-pregnadiene, which after one recrystallisation melt at 209°C. $[\alpha]_D = +227°$ (0.60). IR: 1,735, 1,640, 1,530, 1,465 and 1,240. UV: 309 (10,900).

187 g of the product thus obtained, in 18 ml of $CHCl_3$-methanol (100:1) mixture, are epoxidised with 185 mg of p-nitroperbenzoic acid in the dark for 24 hours at room temperature. The mixture is then diluted with ethyl acetate and is successively washed with aqueous solutions of NaI, $Na_2S_2O_3$, NaCl, $NaHCO_3$ and again NaCl. Thereafter, it is dried over $MgSO_4$ and evaporated in vacuo and the residue, in ethyl acetate-chloroform (1:1) solution, is chromatographed on silica gel. 109 mg of crystals of 3β-methoxy-3α,9α;14β,15β-dioxido-7α,11α,18-triacetoxy-20-oxo-Δ$^{16}$-5β-pregnene are eluted, and melt at 199°–200°C after one recrystallisation. [α]$_D$ = +33° (0.65). IR: 1,735, 1,670, 1,605 and 1,250. UV: 244 (7,850).

The same compound can also be manufactured as follows:

516 mg of 3β-methoxy-3α,9α-oxido-7α,11α,18-triacetoxy-20-oxo-Δ$^{14,16}$-5β-pregnadiene in 30 ml of chloroform-methanol (100:1) mixture, are mixed with 219 mg (= 1.2 equivalent) of p-nitroperbenzoic acid and 3 mg of 2,4,6-tri-tert.-butylphenol as a radical stabiliser, and the mixture is boiled under reflux for 1½ hours. It is then diluted with ethyl acetate and washed successively with aqueous solutions of NaI, Na$_2$S$_2$O$_3$, NaCl, NaHCO$_3$ and again NaCl. The organic phase is dried over magnesium sulphate and concentrated in vacuo and the residue, in benzene-ethyl acetate (4:1) solution, is chromatographed. In the first fractions, 210 mg of 3β-methoxy-3α,9α;14β,15β-dioxido-7α,11α-18-triacetoxy-20-oxo-Δ$^{16}$-5β-pregnene are eluted, melting at 199°–200°C after 2 recrystallisations from ether-hexane.

250 mg of the product thus obtained, in the presence of 375 mg of 5 per cent strength Pd-BaSO$_4$ catalyst are boiled, in a mixture of 28 ml of methanol and 2 ml of cyclohexane, for 3 hours with vigorous stirring, at an oil bath temperature of 120°C. The mixture is then filtered through Celite to remove the catalyst and is evaporated in vacuo and the residue, in benzene-methanol (40:1) mixture, is chromatographed on silica gel. This yields 155 mg of 3β-methoxy-3α,9α-oxido-7α,11α,18-triacetoxy-14β-hydroxy-20-oxo-Δ$^{16}$-5β-pregnene in the amorphous form. IR; 3,580, 1,735, 1,670, 1,615 and 1,250; UV: 836 (9,860).

205 mg of the product thus obtained in 20 ml of 0.1 N NaHCO$_3$ in 90 per cent strength aqueous methanol, are boiled for 15 minutes under N$_2$ (oil bath temperature 80°C). The mixture is then diluted with ethyl acetate, washed with saturated aqueous NaCl solution until neutral and evaporated in vacuo, and the residue, in ethyl acetate, is chromatographed on silica gel. This yields 140 mg of crystals of 3β-methoxy-3α,9α-oxido-7α,11α-diacetoxy-14β,18-dihydroxy-20-oxo-Δ$^{16}$-5β-pregnene, which melt at 222°C after two crystallisations. [α]$_D$ = –41° (0.50). IR: 3,600, 3,450, 1,730, 1,655, 1,610 and 1,240. UV: 236 (9,960).

120 mg of 3β-methoxy-3α,9α-oxido-7α,11α-diacetoxy-14β,18-dihydroxy-20-oxo-Δ$^{16}$-5β-pregnene are stirred with 3 mg of p-toluenesulphonic acid in 3 ml of 2,2-dimethoxypropane for 10 minutes at room temperature. The mixture is then added to aqueous NaHCO$_3$ solution, the whole is extracted with ethyl acetate and the extract is washed with saturated aqueous NaCl solution until neutral. The crude product obtained after drying and evaporation of the organic phase, in benzene-ethyl acetate (1:1) solution, is chromatographed on silica gel. This yields 100 mg of crystals of the (14 → 18)-acetonide of 3β-methoxy-3α,9α-oxido-7α, 11-α-diacetoxy-14β,18-dihydroxy-20-oxo-Δ$^{16}$-5β-pregnene (melting point 194°–195°C after one recrystallisation). [α]$_D$ = –65° (0.60), IR: 1,730, 1,665, 1,620 and 1,240. UV: 236 (9,580).

40 mg of the (14 → 18)-acetonide of 3β-methoxy-3α,9α-oxido-7α,11α-diacetoxy-14β,18-dihydroxy-20-oxo-Δ$^{16}$5β-pregnene, in 3 ml of absolute dioxane, are reduced with 160 mg of Li[Al(t-amyloxy)$_3$H] for 15 minutes at 80°C. The mixture is then added to saturated aqueous (NH$_4$)$_2$SO$_4$ solution, the whole is extracted with ethyl acetate and the extract is subsequently washed with saturated aqueous NaCl solution until neutral. After drying and evaporation of the organic phase, 40 mg of crude product are obtained, which are chromatographed, in methylene chloride-methanol (100:1) solution, on silica gel. First, 23 mg of (14 → 18)-acetonide of (20R)-3β-methoxy-3α,9α-oxido-7α,11α-diacetoxy-14β,18,20-trihydroxy-Δ$^{16}$-5β-pregnene are eluted, melting at 206°–207°C after one crystallisation. [α]$_D$ = –33° (0.45). IR; 3,460 (broad), 1,730 and 1,240.

Later fractions yield 7 mg of (14 → 18)-acetonide of (20S)-3β-methoxy-3α,9α-oxido-7α,11α-diacetoxy-14β,18,20-trihydroxy-Δ$^{16}$-5β-pregnene, melting at 160°–161°C after crystallisation. [α]$_D$ = –36° (0.50). IR; 3,590, 3,450 (broad), 1,730 and 1,240.

200 mg of the starting material used, in 15 ml of absolute methanol, are treated with 200 mg of solid NaBH$_4$ at –30°C. The mixture is then left at –30°C for 24 hours whilst stirring, a further 100 mg of NaBH$_4$ being added after 5 hours. The mixture is then diluted with ethyl acetate and washed with saturated aqueous NaCl solution until neutral. After drying and evaporation of the organic phase, the residue is chromatographed as above. First, 50 mg of the (20R) compound described above are eluted, melting at 215°C after 2 crystallisations from ether-hexane. Later fractions yield 120 mg of the (20S) compound described above.

120 mg of (14 → 18)-acetonide of (20S)-3β-methoxy-3α,9α-oxido-7α,11α-diacetoxy-14b,18,20-trihydroxy-Δ$^{16}$-5β-pregnene are acetylated in 5 ml of acetic anhydride-pyridine (1:1) mixture for 3 hours at room temperature. The whole is then evaporated in vacuo, whereby 125 mg of (14 → 18)-acetonide of (2-0S)-3β-methoxy-3α,9α-oxido-7α,11α,20-triacetoxy-14β,18-dihydroxy-Δ$^{16}$-5β-pregnene (IR: 1,730 and 1,240) are obtained, which are reacted, without purification, in 6 ml of absolute methanol with a solution of 6 mg of p-toluenesulphonic acid in a further 6 ml of absolute methanol, for 15 minutes at room temperature. The mixture is then diluted with ethyl acetate, washed with saturated aqueous NaCl solution until neutral and evaporated in vacuo, and the crude product (115 mg) is crystallised from ether-hexane. (20S)-3β-Methoxy-3α,9α-oxido-7α,11α,20-triacetoxy-14β,18-dihydroxy-Δ$^{16}$-5β-pregnene of melting point 172°–173°C is thus obtained; [α]$_D$ = +48° (0.35), IR: 3,580, 3,460 (broad), 1,730 and 1,240.

160 mg of (20S)-3β-methoxy-3α,9α-oxido-7α,11α,20-triacetoxy-14β,18-dihydroxy-Δ$^{165}$β-pregnene are dissolved in 3 ml of absolute dimethylsulphoxide, 3 ml of absolute acetic anhydride are added and the mixture is left overnight at room temperature. It is then added to ice-cold aqueous NaHCO$_3$ solution, the whole is extracted with ethyl acetate and the extract is washed with a large amount of water, until neutral. The crude product obtained after drying and evaporation of the organic phase, in benzene-ethyl acetate (3:1) solution, is chromatographed on silica gel. 130 mg of crystals of (20S)-3β-methoxy-3α,9α-oxido- 7α,11α,20-triacetoxy-14β-O-methyl-thiomethoxy-18-oxo-$\Delta^{16}$5β-pregnene are obtained, melting at 125°–126°C after crystallisation. $[\alpha]_D = +25°$ (0.40). IR: 2,740, 1,730 and 1,240.

EXAMPLE 5

The starting substance used in Example 2 can be manufactured as follows:

2 g of 3β-methoxy-3α,9α-oxido-11α-acetoxy-14β,18-dihydroxy-20-oxo-$\Delta^{16}$-5β-pregnene are stirred for 20 minutes with 60 mg of p-toluenesulphonic acid in 80 ml of 2,2-dimethoxypropane. The mixture is then neutralised with aqueous sodium bicarbonate solution and worked up. A single crystallisation of the crude product, and chromatography of the mother liquor, resulting therefrom, in benzene-ethyl acetate (1:1) solution, yields a total of 1.9 g of the (14β → 18)-acetonide of 3β-methoxy-3α,9α-oxido-oxido-11α-acetoxy-14β,18-dihydroxy-20-oxo-$\Delta^{16}$-5β-pregnene, melting point 183°–184°C. $[\alpha]_D = -47°$ (0.38). IR: 1,730, 1,665, 1,615, 1,370 (strong), and 1,240. UV: 239 (8,300).

400 mg of the (14 → 18)-acetonide of 3β-methoxy-3α,9α-oxido-11α-acetoxy-14β,18-dihydroxy-20-oxo-$\Delta^{16}$-5β-pregnene in 30 ml of absolute dioxane are reduced with 1.2 g of tri-tert.-amyloxy-lithium aluminum hydride for 20 minutes at 80°C. Working up, and chromatography in methylene chloride-methanol (50:1) solution yields 213 mg of the (14 → 18)-acetonide of (2-OR)-3β-methoxy-3α,9α-oxido-11α-acetoxy-14β,18,20-trihydroxy-$\Delta^{16}$-5β-pregnene, and 77 mg of the (14 → 18)-acetonide of (20S)-3β-methoxy-3α,9α-oxido-11α-acetoxy-14β,18,20-trihydroxy-$\Delta^{16}$-5β-pregnene.

331 mg of the (14 → 18)-acetonide of (20R)-3β-methoxy-3α,9α-oxido-11α-acetoxy-14β,18,20-trihydroxy-$\Delta^{16}$-5β-pregnene are acetylated overnight, at room temperature, in 40 ml of acetic anhydride-pyridine (1:1) mixture. The whole is then evaporated in vacuo and the crude product, in methylene chloride, is filtered over neutral aluminium oxide (activity III). This yields 320 mg of amorphous (14 → 18)-acetonide of (20R)-3β-methoxy-3α,9α-oxido-11α,20-diacetoxy-14β,18-dihydroxy-$\Delta^{16}$-5β-pregnene. IR: 1,730 and 1,240.

330 mg of the (14 → 18)-acetonide of (20R)-3β-methoxy-3α,9α-oxido-11α,20-diacetoxy-14β,18-dihydroxy-$\Delta^{16}$-5β-pregnene are dissolved in 40 ml of methanol and a solution of 40 mg of p-toluenesulphonic acid in a mixture of 20 ml of methanol and 4 ml of water is added. The mixture is then left to stand for 1¾ hours at room temperature and is subsequently worked up. This yields 280 mg of (20R)-3β-methoxy-3α, 9α-oxido-11α,20-diacetoxy-14β,18-dihydroxy-$\Delta^{16}$-5β-pregnene, which are not purified. IR: 3,550 (broad), 3,400 (broad), 1,730 and 1,250.

260 mg of (20R)-3β-methoxy-3α,9α-oxido-11α,20-diacetoxy-14β,18-dihydroxy-$\Delta^{16}$-5β-pregnene are dissolved in 6 ml of absolute dimethylsulphoxide, 6 ml of absolute acetic anhydride are added and the mixture is left to stand for 17 hours at room temperature. It is then worked up and the resulting crude product, in benzene-ethyl acetate (4:1) mixture, is chromatographed. This yields 220 mg of (20R)-3β-methoxy-3α,9α-oxido-11α,20-diacetoxy-14β-methyl-thiomethoxy-18-oxo-$\Delta^{16}$-5β-pregnene in the amorphous form. IR: 2,750, 1,735 and 1,245.

EXAMPLE 6

The starting substance used in Example 3 can be manufactured as follows:

2 g of 3β-methoxy-3α,9α-oxido-11α-acetoxy-14β,18-dihydroxy-20-oxo-$\Delta^{16}$-5β-pregnene are stirred with 60 mg of p-toluenesulphonic acid in 80 ml of 2,2-dimethoxypropane for 20 minutes. The mixture is then neutralised with aqueous sodium bicarbonate solution and worked up. A single crystallisation of the crude product, and chromatography of the mother liquor, resulting therefrom, in benzene-ethyl acetate (1:1) solution yields a total of 1.9 g of the (14β → 18)-acetonide of 3β-methoxy-3α,9α-oxido-11α-acetoxy-14β,18-dihydroxy-20-oxo-$\Delta^{16}$-5β-pregnene, melting point 183°–184°C. $[\alpha]_D = -47°$ (0.38). IR: 1,730, 1,665, 1,615, 1,370 (strong) and 1,240. UV: 239 (8,300).

700 mg of the (14 → 18)-acetonide of 3β-methoxy-3α,9α-oxido-11α-acetoxy-14β,18-dihydroxy-20-oxo-$\Delta^{16}$-5β-pregnene, dissolved in 50 ml of absolute methanol, are cooled to −30°C and 500 mg of solid sodium borohydride are added. The mixture is then stirred for 19 hours at −30°C and is worked up and the product is chromatographed in methylene chloride-methanol (50:1) solution. First, 121 mg of the (14 → 18)-acetonide of (20R)-3β-methoxy-3α,9α-oxido-11α-acetoxy-14β,18,20-trihydroxy-$\Delta^{16}$-5β-pregnene are eluted. Later fractions yield 462 mg of the corresponding (20S)-epimer.

495 mg of the (14 β → 18)-acetonide of (20S)-3β-methoxy-3α,9α-oxido-11α-acetoxy-14β,18,20-trihydroxy-$\Delta^{16}$-5β-pregnene are acetylated overnight at room temperature in 60 ml of acetic anhydride-pyridine (1:1) mixture. The reaction mixture is then evaporated in vacuo and the crude product, in methylene chloride, is filtered over neutral aluminium oxide (activity III). This yields 501 mg of amorphous (14β → 18)-acetonide of (20S)-3β-methoxy-3α,9α-oxido-11α,20-diacetoxy-14β,18-dihydroxy-$\Delta^{16}$-5β-pregnene. IR: 1,730 and 1,240.

530 mg of the (14 → 18)-acetonide of (20S)-3β-methoxy-3α,9α-oxido-11α,20-diacetoxy-14β,18-dihydroxy-$\Delta^{16}$-5β-pregnene in 35 ml of absolute methanol are left to stand with 15 mg of p-toluenesulphonic acid for 15 minutes at room temperature. Working up, and one crystallisation of the crude product from methylene chloride-hexane, yields 398 mg of crystals of (20S)-3β-methoxy-3α,9α-oxido-11α,20-diacetoxy-14β,18-dihydroxy-$\Delta^{16}$-5β-pregnene of melting point 175°–176°C. $[\alpha]_D = -1°$ (0.65). IR: 3,520, 3,400, 1,725 and 1,250.

298 mg of (20S)-3β-methoxy-3α,9α-oxido-11α,20-diacetoxy-14β,18-dihydroxy-$\Delta^{16}$-5β-pregnene are reacted in 9 ml of dimethylsulphoxide-acetic anhydride (1:1) mixture as in the preceding example, the mixture is then worked up and the product, in benzene-ethyl acetate (2:1) solution, is chromatographed. 255 mg of crystals of (20S)-3β-methoxy-3α,9α-oxido-11α,20-diacetoxy-14β-methyl-thiomethoxy-18-oxo-$\Delta^{16}$-5β-pregnene of melting point 114°–115°C are thus obtained. $[\alpha]_D = +24$ (0.75), IR: 2,830, 2,740, 1,735 and 1.245.

EXAMPLE 7

150 mg of 3β,20ξ-diacetoxy-14β-hydroxy-18-(N-methyl-2-chloroacetamido)-5α,17α-pregnane (see Example 7) are dissolved in 18 ml of absolute tetrahydrofuran and 18 ml of absolute benzene; to the obtained solution are added, one after the other, 80 mg of sodium hydride and 0.3 ml of a solution of 160 mg of ethanol in 100 ml of absolute tetrahydrofuran. The mixture is stirred for 3 hours at 50°; to the reaction mixture is then added ethyl acetate, and the whole washed until neutral with saturated aqueous sodium chloride solution. The crude product remaining behind after concentration by evaporation is chromatographed in ethyl acetate on silica gel. By this means are obtained 105 mg of 1'-methyl-2'-oxo-3β,20ξ-diacetoxy-14β,18-(epoxyethanoimino)-5α,17α-pregnane. After two crystallizations from acetone/hexane, the melting point is 251°–252°. IR: 1730, 1650, 1250. $[\alpha]_D = -100°$ (0.46).

EXAMPLE 8

105 mg of 1'-methyl-2'-oxo-3β,20ξ-diacetoxy-14β,18-(epoxyethanoimino)-5α,17α-pregnane are boiled in 40 ml of absolute diethyl ether for 5 hours with 250 mg of lithium aluminium hydride. The reaction mixture is then carefully decomposed with a little water, filtered off from the precipitated aluminium hydroxide, afterwards rinsed with methylene chloride, and the filtrate concentrated by evaporation. Thus obtained are 105 mg of crude 1'-methyl-3β,20ξ-dihydroxy-14β,18-(epoxyethanoimino)-5α,17α-pregnane (IR: 3600). These are acetylated for ca. 15 hours at room temperature in 20 ml of acetic anhydride/pyridine mixture (1:1). By concentration of the reaction mixture in vacuo, and chromatography in ethyl acetate/methanol (9:1) of the crude product remaining behind are obtained 50 mg of 1'-methyl-3β,20ξ-diacetoxy-14β,18-(epoxyethanoimino)-5α,17α-pregnane. M.P. after two crystallizations from methanol/water = 198°–200° (decomposition). IR: 1730, 1250. $[\alpha]_D = -51°$ (0.37).

EXAMPLE 9

33 mg of 3β-methoxy-3α,9α-epoxy-11α,20ξ-diacetoxy-14β-hydroxy-18-(N-methyl-2-chloracetamido)-5β,17α-pregnane (see Example 8) are dissolved in 3 ml of absolute tetrahydrofuran and 3 ml of absolute benzene; first 20 mg of sodium hydride and then 0.1 ml of a solution of 160 mg of ethanol in 100 ml of absolute tetrahydrofuran are added. The mixture is boiled for 4 hours under an argon atmosphere. The excess sodium hydride is then carefully decomposed by the addition of moist ether. Then the reaction mixture is diluted with ethyl acetate and washed neutral with saturated aqueous sodium chloride solution. After concentration by evaporation, the residual crude product is chromatographed in ethyl acetate on silica gel. 26 mg of 1'-methyl-2'-oxo-3β-methoxy-3α,9α-epoxy-11α,20ξ-diacetoxy-14β,18-(epoxyethanoimino)-5β,17α-pregnane is obtained which, after recrystallizing once from acetone/hexane, melts at 239°–240°. $[\alpha]_D = -64°$ (0.25). IR: 1725, 1650, 1250.

EXAMPLE 10

19 mg of 1'-methyl-2'-oxo-3β-methoxy-3α,9α-epoxy-11α,29ξ-diacetoxy-14β,18-(epoxyethanoimino)-5β,17α-pregnane are boiled in a mixture of 7 ml of absolute ether and 2 ml of absolute tetrahydrofuran with 50 mg of lithium aluminium hydride for 5½ hours. Then the excess lithium aluminium hydride is decomposed with saturated aqueous ammonium sulphate solution, diluted with ethyl acetate and washed neutral with aqueous sodium chloride solution. After concentration by evaporation, the crude product which remains is chromatographed on silica gel in an ethyl acetate/methanol solution (10:1), the ethyl acetate portion of which having been previously saturated with 10% aqueous ammonia. 13 mg of crystalline 1'-methyl-3β-methoxy-3α,9αepoxy-11α,20ξ-dihydroxy-14β,18-(epoxyethanoimino)-5β,17α-pregnane are obtained, which, after a crystallization from acetone/hexane, melts at 160°–180° with decomposition. IR: 3640, 3560, 3500–3300 broad, 1095, 1000, 950 in $CH_2Cl_2$.

EXAMPLE 11

10 mg of 1'-methyl-3β-methoxy-3α,9α-epoxy-11α,20ξ-dihydroxy-14β,18-(epoxyethanoimino)-5β,17α-pregnane are acetylated in 5 ml of acetanhydride/pyridine mixture (1:1) for 3 hours at 70°. The reaction mixture is then concentrated by evaporation in vacuum and the crude product is chromatographed in ethyl acetate, which has been saturated with ammonia, or silica gel. 9 mg of 1'-methyl-3β-methoxy-3α,9α-epoxy-11α,20ξ-diacetoxy-14β,18-(epoxyethanoimino)-5β,17α-pregnane are thus obtained, which thus far it has not been possible to crystallize. IR: 1725, 1250, 1100, 1005, 960.

EXAMPLE 12

30 mg of 1'-methyl-3β-methoxy-3α,9α-epoxy-11α,20ξ-dihydroxy-14β,18-(epoxyethanoimino)-5β,17α-pregnane are allowed to stand for 24 hours at room temperature in a mixture of 1 ml of 70% aqueous perchloric acid and glacial acetic acid to make 10 ml. Then the reaction mixture is alkalized with 2 N sodium hydroxide solution, ethyl acetate is added, the solution obtained is washed neutral with saturated sodium chloride solution and concentrated by evaporation. About 23 mg of crude 1'-methyl-3α,9α-epoxy-3β,11α,20ξ-trihydroxy-14β,18-(epoxyethanoimino)-5β,17α-pregnane remain which are chromatographed in a mixture of ethyl acetate, which has been saturated with 10% aqueous ammonia solution and then dried with magnesium sulphate, and methanol (10:1) on very pure silica gel. About 15 mg of pure substance are obtained. IR: 3620, 3560, 3500–3300 broad.

EXAMPLE 13

The 3β,20ξ-diacetoxy-14β-hydroxy-18-(N-methyl-2-chloroacetamido)-5α,17β-pregnane used in Example 7 as starting material can be produced in the following manner:

a. 100 g of lead tetracetate are dried for 2 hours in darkness at room temperature. To this are then added 20 g of dry calcium carbonate, and the mixture is refluxed for 1 hour, with stirring, in 1700 ml of abs. cyclohexane. To this boiling suspension is thereupon added, with vigorous stirring, a hot solution of 21.8 g of 3β-acetoxy-20β-hydroxy-5α-pregnane in 500 ml of abs. cyclohexane and 7.7 g of solid iodine; the reaction mixture is then boiled for a further 30 minutes with vigorous stirring, while externally irradiating with a 1,000 Watt incandescent lamp. A practically complete decolouration of the iodine-containing reaction mixture is thereby observed. After cooling, the mixture is filtered through cotton wool, and the filtrate concentrated in vacuum. The concentration-residue is oxidized for 30 minutes in 800 ml of acetone, at a temperature of ca. 5°, with an excess of an 8 N solution of chromium trioxide in 8 N sulphuric acid. 20 ml of isopropanol is then added, the whole diluted with ethyl acetate, and washed until neutral with saturated aqueous sodium chloride solution. The crude product obtained after drying and concentration by evaporation of the organic phase is refluxed for 3 hours with stirring, in 1,500 ml of abs. methanol with 25 g of silver acetate. The mixture is afterwards filtered through cotton wool, concentrated in vacuum, dissolved in ether, and filtered on neutral aluminium oxide (Act. III). The thereby obtained crude product is chromatographed on 2 kg of silica gel, Merck (grain size 0.05 – 0.2 mm), which has been previously deactivated with 200 ml of water. With a benzene/ethyl acetate mixture (10:1) are thereby eluted 7.5 g of 3$\beta$-acetoxy-18,20-epoxy-20$\xi$-hydroxy-5$\alpha$-pregnane, M.P. 169° (twice recrystallized from acetone/hexane). [$\alpha$]$_D$ = + 33° (0.45). IR: 3590, 1725, 1250.

b. 1 g of 3$\beta$-acetoxy-18,20-epoxy-20$\xi$-hydroxy-5$\alpha$-pregnane is dissolved in a mixture of 7 ml of pyridine and 7 ml of acetanhydride, and the solution obtained is heated in a nitrogen atmosphere for 10 hours to 95°. The solution is allowed to cool; it is then diluted with ethyl acetate, and washed successively with 2 N aqueous hydrochloric acid, saturated aqueous sodium chloride solution, saturated aqueous sodium bicarbonate solution, and again with saturated aqueous sodium chloride solution until the neutral point is attained. The solution is then dried with magnesium sulphate, concentrated in vacuum, and chromatographed on the 100-fold amount of silica gel which has been deactivated previously again with 10 percent water. With benzene/ethyl acetate mixture (10:1) are thereby firstly eluted 395 mg of 3$\beta$,18-diacetoxy-20-oxo-5$\alpha$-pregnane; M.P. 107° after two crystallizations from acetone/hexane. [$\alpha$]$_D$ = + 70° (0.46). IR: 1740, 1710, 1240 (in CCl$_4$). Subsequent fractions consisted of 386 mg of unmodified 3$\beta$-acetoxy-18,20-epoxy-20$\xi$-hydroxy-5$\alpha$-pregnane.

c. An amount of 1.04 g of 3$\beta$,18-diacetoxy-20-oxo-5$\alpha$-pregnane is brominated in 50 ml of dichloromethane with 1.13 g of 90% pyridinehydrobromideperbromide for 30 minutes at room temperature whilst stirring is maintained. The reaction mixture is then diluted with ethyl acetate, repeatedly washed with saturated aqueous sodium chloride solution, dried over magnesium sulphate, and evaporated in vacuum. Thereby obtained are 1.23 g of crude 3$\beta$,18-diacetoxy-17$\xi$-bromo-20-oxo-5$\alpha$-pregnane which is advantageously dehydrobrominated, without any purification, by 3 hours boiling in 20 ml of abs. dimethyl formamide under nitrogen. After cooling, the product is diluted with ethyl acetate and washed at least five times with water. The organic phase is then dried with magnesium sulphate, and evaporated in vacuum. The obtained crude product is first filtered in dichloromethane solution on neutral aluminium oxide (Act. III), and afterwards chromatographed in benzene/ethyl acetate solution (6:1) on silica gel. By this means are obtained 860 mg of 3$\beta$,18-diacetoxy-20-oxo-$\Delta^{16}$-5$\alpha$-pregnene which, after two crystallizations from acetone/hexane, melts at 135°.

[$\alpha$]$_D$ = + 44° (0.35). IR: 1725, 1670, 1590, 1250. UV: 238 ($\epsilon$= 8920).

d. An amount of 800 mg of 3$\beta$,18-diacetoxy-20-oxo-$\Delta^{16}$-5$\alpha$-pregnene is refluxed for 1 hour, with stirring, with 650 mg of N-bromosuccinimide in 50 ml of carbon tetrachloride in the presence of 50 mg of azo-bis-isobutyronitrile. The mixture is allowed to cool; it is then filtered off from the succinimide which has crystallized out, subsequently washed with carbon tetrachloride, and evaporated in vacuum. The crude bromination product is afterwards boiled for 3 hours with 1 g of sodium iodide in 100 ml of acetone, the whole concentrated in vacuo to ca. 25 ml, diluted with ethyl acetate, and successively washed with aqueous solutions of sodium thiosulphate and sodium chloride. The organic phase dried over magnesium sulphate is concentrated in vacuum, and the crude product chromatographed in benzene/ethyl acetate solution (6:1) on silica gel. Thus obtained are 512 mg of oily 3$\beta$,18-diacetoxy-20-oxo-$\Delta^{14,16}$-5$\alpha$-pregnadiene. IR: 1735, 1650, 1530, 1240 (CCl$_4$). UV: 312 ($\epsilon$= 6250).

e. To 976 mg of 3$\beta$,18-diacetoxy-20-oxo- $\Delta^{14,16}$-5$\alpha$-pregnadiene in 40 ml of chloroform there are added 488 mg of p-nitroperbenzoic acid, and the mixture is stirred in darkness for 19 hours at room temperature. The mixture is then diluted with ethyl acetate, and successively washed with aqueous solutions of potassium iodide, sodium thiosulphate, sodium chloride, sodium bicarbonate, and again sodium chloride, until the neutral point is attained. The ethyl acetate phase dried with magnesium sulphate is concentrated in vacuum in a rotary evaporator, and the crude product chromatographed in benzene/ethyl acetate solution (4:1) on silica gel. In this manner are obtained 550 mg of 3$\beta$,18-diacetoxy-14$\beta$, 15$\beta$-epoxy-20-oxo-$\Delta^{16}$-5$\alpha$-pregnene, M.P. 128°–129° (twice crystallized from acetone/hexane). [$\alpha$]$_D$ =+62° (0.42). IR: 1725, 1670, 1600, 1250. UV: 249 ($\epsilon$= 8270).

f. An amount of 300 mg of 3$\beta$,18-diacetoxy-14$\beta$,15$\beta$-epoxy-20-oxo $\Delta^{16}$-5$\alpha$-pregnene is exhaustively hydrogenated in 80 ml of ethanol in the presence of 100 mg of 5% palladium on barium sulphate at room temperature and under normal pressure. After completion of the hydrogen absorption, the catalyst is separated by filtration, and the filtrate is evaporated in vacuum. The crude hydrogenation product is then filtered on neutral aluminium oxide (Act. III). Thus obtained are 282 mg of oily 3$\beta$,18-diacetoxy-14$\beta$-hydroxy-20-oxo-5$\alpha$,17$\alpha$-pregnane. IR: 3600–3200 broad, 1735, 1240 (CCl$_4$).

g. An amount of 282 mg of 3$\beta$,18-diacetoxy-14$\beta$-hydroxy-20-oxo-5$\alpha$,17$\alpha$-pregnane is stirred in 40 ml of tetrahydrofuran with 430 mg of lithium aluminium tritert. butoxy-hydride for 5 hours at room temperature. The excess hydride is then decomposed with 5% aqueous acetic acid (ca. 2 ml), diluted with ethyl acetate and washed successively with aqueous solutions of sodium bicarbonate and sodium chloride until the neutral point is attained. The crude product obtained after drying and concentration in vacuum is chromatographed in benzene/ethyl acetate solution (1:1) on silica gel, whereby 217 mg of oily 3$\beta$,18-diacetoxy-14$\beta$,20$\xi$-dihydroxy-5$\alpha$,17$\alpha$-pregnane are eluted. IR: 3600–3300 broad, 1735, 1240 (CCl$_4$).

h. 150 mg of 3$\beta$,18-diacetoxy-14$\beta$,20$\xi$-dihydroxy-5$\alpha$,17$\alpha$-pregnane are allowed to stand in 10 ml of pyridine/acetanhydride mixture (1:1) for 16 hours at room temperature. The acetylation mixture is then concentrated in vacuum, whereby 155 mg of chromatographically homogeneous oily 3β,18,20ξ-triacetoxy-14β-hydroxy-5α,17α-pregnane are obtained. IR: 3580, 1735, 1240 (CCl$_4$).

i. An amount of 150 mg of 3β,18,20α-triacetoxy-14β-hydroxy-5α,17α-pregnane is hydrolyzed in a mixture of 32 ml of methanol and 3.5 ml of aqueous 1% sodium bicarbonate solution for 5 minutes at boiling temperature. The solution is then neutralized with glacial acetic acid, diluted with ethyl acetate, and washed until neutral with aqueous sodium chloride solution. The crude product remaining behind after concentration by evaporation is chromatographed in benzene/ethyl acetate solution (1:1) on silica gel. Firstly eluted thereby are 38 mg of unmodified starting material, there then follow 67 mg of transition fractions, and afterwards 49 mg of 3β,20ξ-diacetoxy-14β,18-dihydroxy-5α,17α-pregnane, M.P. 180°–181° (twice crystallized from acetone/hexane). [α]$_D$ = −7°(0.46). IR: 3600–3300, 1730, 1240 (CCl$_4$).

j. 95 mg of 3β,20ξ-diacetoxy-14β,18-dihydroxy-5α,17α-pregnane are oxidized in 10 ml of acetone at 0° for 2 minutes, with stirring, with an excess of an 8 N solution of chromium trioxide in 8 N sulphuric acid. The chromium trioxide excess is then decomposed by the addition of 2 ml of isopropanol. The reaction mixture is taken up in ethyl acetate, and washed with saturated aqueous sodium chloride solution until a neutral, colourless organic phase results. After drying and concentration thereof in vacuum, 85 mg of crude product are obtained, which are chromatographed in benzene/ethyl acetate solution (1:1) on silica gel. Eluted thereby are 65 mg of 3β,20ξ-diacetoxy-14β-hydroxy-18-oxo-5α,17α-pregnane which, after two crystallizations from acetone/hexane, melts at 170°–171°. [α]$_D$ = 0° (0.42). IR: 3610, 3480, 2720, 1735, 1720 + 1710 (double bands for the aldehydecarbonyl), 1240 (CCl$_4$).

k. An amount of 270 mg of 3β,20ξ-diacetoxy-14β-hydroxy-18-oxo-5α,17α-pregnane is heated with 50 ml of methylamine in 50 ml of abs. benzene for 15 hours in a bomb tube to 120°. The mixture is concentrated in vacuo, dissolved in 10 ml of acetanhydride/pyridine mixture (1:1), allowed to stand for 3 hours at room temperature, and concentrated in vacuum, whereby 260 mg of 3β,20ξ-diacetoxy-14β-hydroxy-18-(methylimino)-5α,17α-pregnane are obtained. IR: 3300 broad, 2760, 1730, 1655, 1240 (CCl$_4$).

l. The methylimino compound obtained according to (k) is reduced in 50 ml of methanol with 300 mg of sodium borohydride in 10 ml of water at 20° for 20 minutes. To the reaction mixture is then added ethyl acetate, the whole washed until neutral with saturated aqueous sodium chloride solution, and concentrated by evaporation, whereby 280 mg of 3β,20ξ-diacetoxy-14β-hydroxy-18-(methylamino)-5α,17α-pregnane are obtained. IR: 3500–2600 broad, 1730, 1250.

m. The methylamino compound obtained according to (l) is dissolved together with 135 mg of chloroacetyl chloride in 50 ml of chloroform. To the solution are added at 0°, with vigorous stirring, 48 mg of sodium hydroxide in 10 ml of water. After 10 minutes the solution is diluted with more chloroform, the organic phase separated, washed with saturated aqueous sodium chloride solution until neutral, dried with magnesium sulphate, concentrated in vacuum, and the residue chromatographed in ethyl acetate on silica gel. In this manner are obtained 186 mg of 3β,20ξ-diacetoxy-14β-hydroxy-18-(N-methyl-2-chloroacetamido)-5α,17α-pregnane, M.P. 194°–196°. IR: 3380 broad, 1730, 1640, 1250.

EXAMPLE 14

The 3β-methoxy-3α,9α-epoxy-11α,20ξ-diacetoxy-14β-hydroxy-18-(N-methyl-2-chloroacetamido)5β,17α-pregnane, used as starting material in Example 9, can be produced as follows:

a. 10 g of (20R)-3-ethylenedioxy-20-hydroxy-Δ$^{5,9(11)}$-pregnadien-18-acid lactone-( → 20) are boiled in 300 ml of absolute tetrahydrofuran with 7 g of lithium aluminium hydride for 2 hours. Then the excess hydride is decomposed with about 5 ml of saturated aqueous ammonium sulphate solution while cooling with ice. Then 20 g of Celite are added and stirred for 30 minutes at room temperature; the aluminium hydroxide/Celite mixture is removed by filtration, rinsed with ethyl acetate, and the filtrate is concentrated by evaporation in vacuum to yield 9.7 g of (20R)-3-ethylenedioxy-18,20-dihydroxy-Δ$^{5,9(11)}$-pregnadiene which, after a crystallization from methylene chloride/hexane, melts at 201°. [α]$_D$ = −35° (0.49). IR: 3600, 3500–3200.

b. 10.7 g of (20R)-3-ethylenedioxy-18,20-dihydroxy-Δ$^{5,9(11)}$-pregnadiene are refluxed for 2 hours in 1500 ml of acetone and 100 ml of water with 1.5 g of p-toluenesulphonic acid. The reaction solution is then concentrated under vacuum to about 500 ml. By careful addition of water to this solution, the desired (20R)-3-oxo-18,20-dihydroxy-Δ$^{4,9(11)}$-pregnadiene precipitates as crystals. These are then suction filtered, washed neutral with a large amount of water, dried, and recrystallized once from methanol/water to yield 7 g of crystals having a melting point of 194°. [α]$_D$ = +59° (0.61). IR: 3600, 3550–3100, 1660, 1615. UV: 224 (16700).

c. 7 g of (20R)-3-oxo-18,20-dihydroxy-Δ$^{4,9(11)}$-pregnadiene are hydrogenated in 250 ml of 0.1 N ethanolic potassium hydroxide solution in the presence of 1 g of 5% palladium/charcoal catalyst with one equivalent of hydrogen. After the calculated amount of hydrogen has been taken up, the hydrogenation is interrupted, and the catalyst is removed from the solvent by filtration. By the careful addition of water to the filtrate, (20R)-3-oxo-18,20-dihydroxy-Δ$^{9(11)}$-5β-pregnene precipitates as crystals. After suction filtration, washing neutral with a large amount of water, drying in vacuum and recrystallization from methanol/water, 6.7 g of pure crystallization product having a melting point of 198° are obtained, [α]$_D$ = −2° (0.49). IR: 3600, 3550–3200, 1705.

d. 5.1 g of (20R)-3-oxo-18,20-dihydroxy-β$^{9(11)}$-5β-pregnene in 60 ml of pyridine and 40 ml of acetanhydride are allowed to stand for 1 hour at room temperature. Then the excess acetanhydride is decomposed by the careful addition of 80 ml of methanol, the temperature being kept at about 0° by the addition of solid carbon dioxide in portions. Then the reaction mixture is left to stand for 30 minutes at room temperature, evaporated in vacuum, and the crude product is chromatographed in benzene/ethyl acetate (1:1) on silica gel. First 1.5 g of (20R)-3-oxo-18,20-diacetoxy-Δ$^{9(11)}$-5β-pregnene [IR: 1740–1700, 1250], which can be reconverted into the starting material for the acetylation by alkaline hydrolysis in 5% methanolic potassium hydroxide solution. Later fractions yield 2.1 g of (20R)-3-oxo-18-acetoxy-20-hydroxy-Δ$^{9(11)}$-5β-pregnene which, after crystallization from methylene chloride/hexane, melts at 110°. $[\alpha]_D = 0°$ (0.48). IR: 3580, 1730, 1710, 1250. Further fractions yield 2.0 g of unmodified (20R)-3-oxo-18,20-dihydroxy-$\Delta^{9(11)}$-5$\beta$-pregnene.

e. 1.5 g of (20R)-3-oxo-18-acetoxy-20-hydroxy-$\Delta^{9(11)}$-5$\beta$-pregnene in 100 ml of acetone are oxidized at room temperature while stirring with an excess of an 8 N solution of chromium trioxide in 8 N sulphuric acid for 15 minutes. Then 5 ml of methanol are added, the mixture is diluted with ethyl acetate, and the organic phase is washed with saturated aqueous sodium chloride solution. After drying and concentration by evaporation, 1.49 g of crude product are obtained which, dissolved in dichloromethane, is filtered through neutral aluminium oxide (Act. III). It is then crystallized from acetone/hexane to yield 1.4 g of 3,20-dioxo-18-acetoxy-$\Delta^{9(11)}$-5$\beta$-pregnene, M.P. 112°–114°. $[\alpha]_D = +67°$ (0.48). IR: 1745, 1720, 1710, 1230 (CCl$_4$).

f. 1.2 g of osmium tetroxide are added to 1.15 g of 3,20-dioxo-18-acetoxy-$\Delta^{9(11)}$-5$\beta$-pregnene in 15 ml of pyridine and allowed to stand for 6½ days in the dark at room temperature. Then the reaction mixture is evaporated to dryness in vacuum with the repeated addition of benzene; the residue is dissolved in 40 ml of freshly distilled dioxane. Then 40 ml of saturated, aqueous ammonium chloride solution are added and hydrogen sulphide is passed through the two-phase system during 1 hour. 6 g of shredded filter paper are added. After heating for 1 hour at 70°, the mixture is filtered through Celite and then successively washed with 500 ml of ethyl acetate, 100 ml of methanol, 100 ml of water, 100 ml of dichloromethane and again 500 ml of ethyl acetate. The filtrate is diluted with more ethyl acetate and washed several times with saturated, aqueous ammonium chloride solution. Then the organic phase is dried with magnesium sulphate and concentrated by evaporation in vacuum. 1.23 g of crude product are obtained which, in ethyl acetate/methanol solution (9:1), is chromatographed on silica gel to yield 1.13 g of 3$\beta$,11$\alpha$-dihydroxy-3$\alpha$,9$\alpha$-epoxy-18-acetoxy-20-oxo-5$\beta$-pregnane [IR: 3600–3200, 1740, 1710, 1230 (CCl$_4$)], which is further processed without purification.

g. 775 mg of 3$\beta$,11$\alpha$-dihydroxy-3$\alpha$,9$\alpha$-epoxy-18-acetoxy-20-oxo-5$\beta$-pregnane in 30 ml of 0.1 N absolute methanolic hydrogen chloride solution are left for 20 minutes at room temperature. Then the mixture is poured onto a saturated, aqueous sodium bicarbonate solution, extracted with ethyl acetate, and the resulting organic phase is washed several times with saturated, aqueous sodium chloride solution. After drying the solution with magnesium sulphate and concentration by evaporation, the crude product obtained (745 mg) is acetylated in 30 ml of acetanhydride/pyridine mixture (1:1) for 3½ hours at 70°. The reaction mixture is then concentrated by evaporation in vacuum, and the crude product obtained is filtered in dichloromethane on neutral aluminium oxide (Act. III) to yield 805 mg of 3$\beta$-methoxy-3$\alpha$,9$\alpha$-epoxy-11$\alpha$,18-diacetoxy-20-oxo-5$\beta$-pregnane which, after one crystallization from acetone/hexane, melts at 151°–152°. $[\alpha]_D = +106°$ (0.46). IR: 1735, 1705, 1245.

h. 500 mg of 3$\beta$-methoxy-3$\alpha$,9$\alpha$-epoxy-11$\alpha$,18-diacetoxy 20-oxo-5$\beta$-pregnane in 40 ml of carbon tetrachloride are boiled for 1 hour with 208 mg of finely pulverized 96% N-bromosuccinimide and 10 mg of aza-bis-isobutyronitrile while irradiating externally with a 1,000 W incandescent lamp. After cooling, the precipitated succinimide is removed by filtration, rinsed with carbon tetrachloride, and the filtrate is concentrated by evaporation in vacuum. The resultant bromination product, without purification, is heated at 120° for 160 minutes under a nitrogen atmosphere in 40 ml of absolute dimethyl formamide with 500 mg of lithium carbonate and 500 mg of lithium bromide. The mixture is then diluted with a large amount of ethyl acetate, and the organic phase is washed at least five times with water. After drying and evaporating the ethyl acetate phase, 488 mg of crystals are obtained which, in dichloromethane, are filtered on neutral aluminium oxide (Act. III) to yield 435 mg of 3$\beta$-methoxy-3$\alpha$,9$\alpha$-epoxy-11$\alpha$,18-diacetoxy-20-oxo-$\Delta^{16}$-5$\beta$-pregnene which, after crystallizing twice (307 mg), melts at 167°–168°. $[\alpha]_D = +61°$ (0.53). IR: 1730, 1668, 1590, 1245. UV: 237 (8750). After chromatography of the mother liquor in hexane/acetone solution (3:1) on silica gel and subsequent crystallization from acetone/hexane, 37 mg more of the product can be obtained.

i. 500 mg of 3$\beta$-methoxy-3$\alpha$,9$\alpha$-epoxy-11$\alpha$,18-diacetoxy-20-oxo-$\Delta^{16}$-5$\beta$-pregnene in 150 ml of carbon tetrachloride are boiled for 17 minutes with 240 mg of 96% N-bromosuccinimide and 20 mg of aza-bis-isobutyronitrile while irradiating externally with a 1,000 W incandescent lamp. After cooling, the precipitated succinimide is removed by filtration. After concentration of the filtrate by evaporation, the residue obtained is dissolved in 50 ml of absolute dimethyl formamide and heated under nitrogen for 10 minutes at 130° while stirring with 500 mg of lithium bromide and 500 mg of lithium carbonate. The mixture is then substantially concentrated in vacuum, diluted with ethyl acetate, and washed several times with water. After drying and concentration by evaporation of the organic phase, the crude product obtained is chromatographed in benzene/ethyl acetate solution (2:1) on silica gel to yield 330 mg of 3$\beta$-methoxy-3$\alpha$,9$\alpha$-epoxy-11$\alpha$,18-diacetoxy-20-oxo-$\Delta^{14,16}$-5$\beta$-pregnadiene which, after crystallizing once from acetone/hexane, melts at 146°–147°. $[\alpha]_D = +302°$ (0.50). IR: 1730, 1645, 1525, 1465, 1245, 845. UV: 312 (10550).

j. 250 mg of 3$\beta$-methoxy-3$\alpha$,9$\alpha$-epoxy-11$\alpha$,18-diacetoxy-20-oxo-$\Delta^{14,16}$-5$\beta$-pregnadiene which has been purified by chromatography but not recrystallized, are boiled for 80 minutes with 500 mg of p-nitroperbenzoic acid in a mixture of 100 ml of chloroform and 1 ml of absolute methanol. The mixture is then diluted with ethyl acetate, and successively washed with ice-cold, aqueous solutions of sodium iodide, sodium thiosulphate, sodium chloride, sodium bicarbonate and again sodium chloride. After concentration of the organic phase by evaporation, the crude product obtained is chromatographed in hexane/acetone solution (2:1) on silica gel to yield 210 mg of 3$\beta$-methoxy-3$\alpha$,9$\alpha$:14$\beta$,15$\beta$-diepoxy-11$\alpha$,18-diacetoxy-20-oxo-$\Delta^{16}$-5$\beta$-pregnene which, after crystallizing three times from acetone/hexane, melts at 198°. $[\alpha]_D = +66°$ (0.58). IR: 1735, 1670, 1605, 1240. UV: 248 (6890).

k. 100 mg of 3$\beta$-methoxy-3$\alpha$,9$\alpha$:14$\beta$,15$\beta$-diepoxy-11$\alpha$,18-diacetoxy-20-oxo-$\Delta^{16}$-5$\beta$-pregnene in 20 ml of ethanol are thoroughly hydrogenated in the presence of 40 mg of 5% palladium on barium sulphate. Then the catalyst is removed by filtration. Chromatography in benzene/ethyl acetate solution (1:1) on silica gel yields 55 mg of 3$\beta$-methoxy-3$\alpha$,9$\alpha$-epoxy-11$\alpha$,18-diacetoxy- 14β-hydroxy-20-oxo-5β, 17α-pregnane which, after crystallizing once from acetone/hexane, melts at 154°. [α]$_D$ = 0° (0.40) IR: 3600, 3400 broad, 1735, 1705; 1245.

l. 200 mg of sodium boro-hydride in 1 ml of water are added at room temperature to 197 mg of 3β-methoxy-3α,9α-epoxy-11α,18-diacetoxy-14β-hydroxy-20-oxo-5β,17α-pregnane in 10 ml of methanol. The mixture is then stirred for 20 minutes at room temperature, diluted with a large amount of ethyl acetate, and the resulting organic phase is washed neutral with saturated, aqueous sodium chloride solution. It is then dried with magnesium sulphate and evaporated in vacuum. The resultant crude product is acetylated in 20 ml of pyridine/acetanhydride mixture (1:1) for 3 hours at room temperature, then evaporated in vacuum and chromatographed in benzene/ethyl acetate solution (1:1) on silica gel, whereby 172 mg of 3β-methoxy-3α,9α-epoxy-11α,18,20ξ-triacetoxy-14β-hydroxy-5β,17α-pregnane are eluted. After crystallizing twice from acetone/hexane, it melts at 195°. [α]$_D$ = +7° (0.31). IR: 3570, 1725, 1250.

m. 132 mg of 3β-methoxy-3α,9α-epoxy-11α,18,20ξ-triacetoxy-14β-hydroxy-5β,17α-pregnane are boiled for 7 minutes in 18 ml of a 0.1% sodium bicarbonate solution in 90% aqueous methanol. The reaction solution is then poured onto ice, immediately extracted with ethyl acetate, and the organic phase is washed neutral with saturated, aqueous sodium chloride solution. After drying and concentrating by evaporation of the ethyl acetate phase, the crude product obtained is chromatographed in benzene/ethyl acetate solution. (1:1) on silica gel to yield, besides 18 mg of starting material, 83 mg of 3β-methoxy-3α,9α-epoxy-11α,20ξ-diacetoxy-14β,18-dihydroxy-5β,17α-pregnane which, after crystallizing once from acetone/hexane, melts at 203°–205°. [α]$_D$ = −2° (0.47). IR: 3600, 3460 broad, 1725, 1250.

n. 90 mg of 3β-methoxy-3α,9α-epoxy-11α,20ξ-diacetoxy-14β,18-dihydroxy-5β,17α-pregnane in 10 ml of acetone are oxidized at 0° with stirring for 3 minutes with a slight excess of an 8 N solution of chromium trioxide in 8 N aqueous sulphuric acid (0.35 ml). Then the excess chromium trioxide is decomposed by the addition of isopropanol, the mixture is diluted with ethyl acetate, and washed neutral as quickly as possible with saturated, aqueous sodium chloride solution. After drying and concentration by evaporation of the ethyl acetate phase, the resulting crude product is chromatographed in benzene/ethyl acetate solution (1:1) on silica gel to yield 62 mg of 3β-methoxy-3α,9α-epoxy-11α,20ξ-diacetoxy-14β-hydroxy-18-oxo-5β,17α-pregnane which, after crystallizing once from acetone/hexane, melts at 209°. [α]$_D$ = +13° (0.40). IR: 3580, 3450, 2730, 1730, 1705, 1250.

o. 64 mg of 3β-methoxy-3α,9α-epoxy-11α,20ξ-diacetoxy-14β-hydroxy-18-oxo-5β,17α-pregnane are heated with 1 ml of methylamine in 10 ml of absolute benzene for 15 hours in a closed tube at 120°. After evaporating in vacuum, the residue is dissolved in 10 ml of acetanhydride/pyridine mixture (1:1), then left for 3 hours at room temperature and concentrated by evaporation in vacuum. 67 mg of 3β-methoxy-3α,9α-epoxy-11α,20ξ-diacetoxy-14β-hydroxy-18-methylimino-5β,17α-pregnane are obtained. IR: 3200 broad, 1725, 1665, 1250.

p. The methylimino compound obtained according to (o) is reduced in 10 ml of methanol with 75 mg of sodium boro-hydride in 1 ml of water for 20 minutes at room temperature. Then ethyl acetate is added to the reaction mixture which is then washed neutral with saturated, aqueous sodium chloride solution, and concentrated by evaporation. 60 mg of 3β-methoxy-3α,9α-epoxy-11α,20ξ-di-acetoxy-14β-hydroxy-18 -methylamino-5β,17α-pregnane are obtained. IR: 3500–2600, 2790, 1725, 1250.

q. The methylamino compound obtained according to (p) is dissolved together with 77 mg of chloracetyl chloride in 10 ml of chloroform. While stirring vigorously, 28 mg of sodium hydroxide in 2 ml of water are added at 0°. After 10 minutes, the solution is diluted with ethyl acetate, the organic phase is separated, washed neutral with saturated, aqueous sodium chloride solution, dried with magnesium sulphate, evaporated in vacuum, and the residue is chromatographed in ethyl acetate on silica gel to yield 42 mg of 3β-methoxy-3α,9α-epoxy-11α,20ξ-di-acetoxy-14β-hydroxy-18-(N-methyl-2-chloracetamide)-5β,17α-pregnane which, after crystallizing once from acetone/hexane, melts at 173°. [α]$_D$ = +12° (0.42). IR: 3350 broad, 1725, 1640, 1250.

What we claim is:

1. Process for the manufacture of compounds of the formula (I)

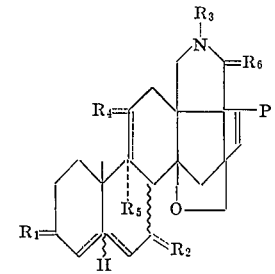

in which P denotes one of the two following partial formulae

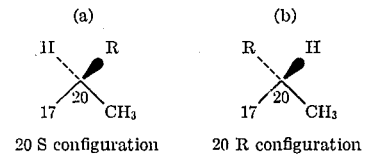

wherein R represents a free, esterified or etherified hydroxyl group, $R_1$ denotes a free or protected oxo group or a free, esterified or etherified hydroxyl group together with a hydrogen atom, $R_2$ denotes two hydrogen atoms, or a hydrogen atom next to a 7,8-double bond, a free or protected oxo group or a hydrogen atom together with a free, esterified or etherified hydroxyl group, $R_3$ denotes hydrogen, a lower alkyl group or a monocyclic lower aliphatic aralkyl group, $R_4$ denotes two hydrogen atoms or a hydrogen atom next to a 9,11-double bond or a free or protected oxo group or a free, esterified or etherified hydroxyl group together with a hydrogen atom, $R_5$ denotes a hydrogen atom or a free, esterified or etherified hydroxyl group and $R_1$ together with $R_5$ denotes a 3-hydroxy-3,9-oxido group or a 3-hydroxy-3,9-oxido group having the 3-hydroxy group in etherified or esterified form and $R_6$ denotes two hydrogen atoms or an oxo group, and in which, in one of the positions 4,5 or 5,6 and/or, where relevant, in the case that $R_2$ or $R_4$ denotes a H atom, also in one of the position 7,8 and/or 9,11, double bonds may be present, and their salts, characterised in that a compound of the formula (III)

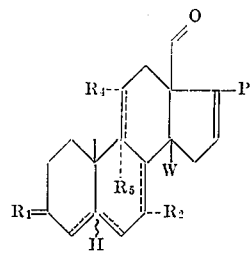

wherein $R_1$, $R_2$, $R_4$, $R_5$ and P have the meaning indicated for the formula I and in which double bonds can be present in one of the positions 4,5 or 5,6 and/or, where relevant, in the case that $R_2$ or $R_4$ denotes a H atom, also in one of the positions 7,8 and/or 9,11, and wherein W denotes an etherified hydroxyl group, is reacted with an aliphatic amine of the formula $R_3 - NH_2$, wherein $R_3$ has the meaning indicated above for the formula I, or with ammonia, the resulting Schiff's base is reduced with an alkali borohydride or some other complex light metal hydride of lower basicity than the alkali metal borohydride to give the corresponding amine, the latter is reacted with a halogenoacetic acid halide, the compounds thus obtained, of the partial formula (IV)

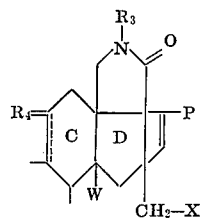

wherein $R_3$, $R_4$, P and W have the above meaning and X represents a halogen atom, are treated with a strong acid, whereby the group W is converted into the hydroxyl group, the resulting compounds are cyclised by treatment with a basic agent.

2. A process as claimed in claim 1, wherein the compounds of formula (V)

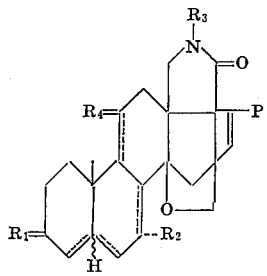

wherein $R_1$–$R_4$ and P have the same meaning as for formula 3 of claim 10 and in which double bonds are optionally present, as in the case of formula III, the lactam group is reduced to the corresponding amino group by means of a complex metal hydride.

3. A process as claimed in claim 2, wherein in the products obtained protected hydroxyl or oxo groups are set free.

4. A process as claimed in claim 1, wherein the reaction is carried out in the temperature range of approximately 80° – 150° in an aromatic hydrocarbon solvent optionally in the presence of a water binding molecular sieve.

5. A process as claimed in claim 1, wherein for the reduction of the Schiff's base obtained to the corresponding amine there is used an alkali metal boron hydride and the reduction is carried out at room temperature in a lower alkanol, optionally in the presence of water.

6. A process as claimed in claim 1, wherein the reaction of the amine obtained by reduction of the Schiff's base with a halogenoacetic acid is carried out in the presence of an alkali metal hydroxide at room temperature.

7. A process as claimed in claim 1, wherein the cyclization of the compound of partial formula IV is effected by the action of a member selected from the group consisting of an alkali metal hydroxide, silver oxide, an alkali metal carbonate, an alkali metal alcoholate and an alkali metal hydride, in a solvent selected from the group consisting of a hydrocarbon, an ether and an alcohol.

8. A process as claimed in claim 7, wherein there is used sodium hydride.

9. A process as claimed in claim 8, wherein the reaction is performed in a mixture of benzene and tetrahydrofuran, preferably in the ratio of 1:1 and optionally in the presence of catalytic amounts of an alcohol.

10. Process as claimed in claim 2, wherein sodium or lithium aluminium hydride is used in an ether.

11. Process as claimed in claim 2, wherein a hydroxyl group present in the 7- position is split off to form a 7,8-double bond by the action of an acid halide in the presence of a tertiary base, after having selectively acylated other free hydroxyl groups under mild conditions.

12. Process as claimed in claim 11, wherein thionyl chloride in the presence of pyridine is used at room temperature.

13. Process as claimed in claim 1, wherein the splitting of the ether group W to give the free 14-hydroxyl group is effected by treatment with an acid under mild conditions or with chloramine P in dioxane-water.

14. Process as claimed in claim 2, wherein the compounds obtained are treated in the following manner: treated with non-reducing alkaline agents to saponify all esterified hydroxyl groups present, selective acylation of the hydroxyl groups under mild conditions, exception for the 7-hydroxyl group, splitting off of the 7-hydroxyl group to form the 7,8-double bond, reduction of the lactam group to the amine group and, if appropriate, liberation of esterified and/or etherified hydroxyl groups.

15. Process as claimed in claim 2, wherein the compounds obtained are treated in the following manner: reduction of the lactam group and liberation of etherified or esterified hydroxyl groups, optionally after prior dehydrogenation of an 11-hydroxyl group to the oxo group.

16. A process as claimed in claim 1, in that 7,8-dihydrobatrachotoxinin A or 7,8-dihydro-epibatrachotoxinin A or their esters and ethers are manufactured, starting from a compound of the formula VI or VII (VI), (VII) [structures with AcO, R'O, W, R", OAc, CH₃]

in which R" denotes two hydrogen atoms, W represents a hydroxyl group etherified with a 2-thiapropanol with 2–8 C atoms, R' represents a lower alkyl group with 1–6 C atoms, and Ac denotes lower aliphatic acyl groups with 1–6 C atoms, and compounds of the formula V of claim 10 are prepared by using the method of claim 15 and in these products the lactams group is reduced and if required any protected hydroxyl group is set free or any free hydroxyl group is esterified or etherified.

17. A process as claimed in claim 1, in that batrachotoxinin A, epi-batrachotoxinin A or their ester and ethers are manufactured starting from a compound of the formulae VI or VII (VI), (VII) [structures]

in which R" denotes the $$\overset{OAc}{\underset{H}{\diagdown}}$$

group, wherein, Ac means a lower aliphatic acly group with 1–6 C-atoms, and W a hydroxyl group etherified with a 2-thiapropanol with a total of 2–8 C-atoms, and compounds of the formula V are prepared by using the method claimed in claim 14, and in these products the esterified hydroxyl groups are liberated by alkaline treatment, the 11- and 20-hydroxyl groups are converted into esterified hydroxly groups by acylation under mild conditions, the 7α-hydroxyl group is split off by treatment with a dehydrating agent to form the 7,8-double bond, the lactam group is then reduced to the amine group and, if required any protected hydroxyl group is set free or any free hydroxyl group is esterified or etherified.

18. A process as claimed in claim 1, in that batrachotoxinin A, epi-batrachotoxinin A or their esters or ethers are manufactured starting from a compound of the formulae (VI), (VII) [structures]

of claim 1, is prepared, in this compound the lactam group is reduced to the amine group by treatment with a complex light metal hydride of the type of lithium aluminium hydride and at the same time all esterified hydroxyl groups are liberated, the 11- and 20-hydroxy groups are converted into esterified hydroxyl groups by acylation under mild conditions, the 7α-hydroxyl group, is split off by treatment with a dehydrating agent, to form the 7,8-double bond and, if required, free hydroxyl groups thus obtained are esterified or etherified.

19. Compounds of the formula

[structure showing steroid skeleton with R₃, R₁, R₅, R, W, CH₂—X, P]

in which X stands for chlorine, bromine or iodine, P denotes one of the two following partial formulae (a) 20 S configuration    (b) 20 R configuration wherein R represents a free, esterified or etherified hydroxyl group, $R_1$ denotes a free or protected oxo group or a free, esterified or etherified hydroxyl group together with an hydrogen atom, R$_2$ denotes two hydrogen atoms, or an hydrogen atom next to a 7,8-double bond, a free or protected oxo group or an hydrogen atom together with a free, esterified or etherified hydroxyl group, R$_3$ denotes hydrogen, a lower alkyl group or a monocyclic lower aliphatic aralkyl group, R$_4$ denotes two hydrogen atoms or an hydrogen atom next to a 9,11-double bond or a free or protected oxo group or a free, esterified or etherified hydroxyl group together with an hydrogen, atom, R$_5$ denotes an hydrogen atom or a free, esterified or etherified hydroxyl group and R$_1$ together with R$_5$ denotes a 3$\beta$-hydroxy-3$\alpha$,9$\alpha$-oxido group or a 3$\beta$-hydroxy-3$\alpha$,9$\alpha$-oxido group having the 3-hydroxy group in etherified or esterified form and W denotes an etherified hydroxyl group, whereby any protected oxo group is an oxo group ketalized with a lower alkanol or alkanediol, any etherified hydroxyl group is an hydroxyl group etherified with an alcohol containing 1–8 carbon atoms, and any esterified hydroxyl group is an hydroxyl group esterified with a carboxylic acid containing 1–18 carbon atoms.

20. Compounds as claimed in claim 19, wherein W is an etherified hydroxyl group derived from a 2-thiapropanol or a 2-thia-arylethanol having in total not more than 8 carbon atoms.

21. A compound of the formula

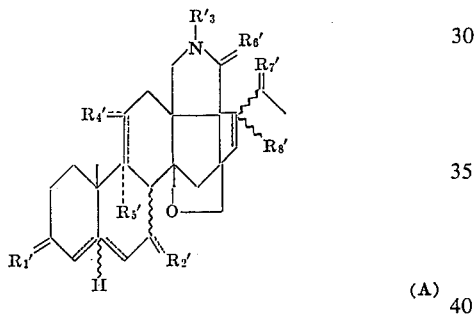

(A)

wherein R$_1'$ represents a free or protected oxo group or a free, esterified or etherified hydroxyl group and a hydrogen atom, or a free or etherified hydroxyl group and together with R$_5'$, the $\alpha$-epoxy radical, R$_2'$ a free or protected oxo radical or a free, esterified or etherified hydroxyl group and a hydrogen atom, or two hydrogen atoms, or, when occurring at a double bond, one hydrogen atom, R$_3'$ represents a lower alkyl group, the benzyl group or a hydrogen, R$_4'$ has the same meaning as R$_2'$, R$_5'$ is an $\alpha$-oriented hydrogen atom, an $\alpha$-oriented hydroxyl group or together with R$_1'$ an $\alpha$-oriented epoxy radical, R$_6'$ represents an oxo radical, R$_7'$ represents a free or protected oxo group or a free, esterified or etherified hydroxyl group and a hydrogen atom, and R$_8'$ represents an $\alpha$- or $\beta$-oriented hydrogen atom, or a free, esterified or etherified hydroxyl group, whereby any protected oxo group is an oxo group ketalized with a lower alkanol or alkanediol, any etherified hydroxyl group is an hydroxyl group etherified with an alcohol containing 1–8 carbon atoms, and any esterified hydroxyl group is an hydroxyl group esterified with a carboxylic acid containing 1–18 carbon atoms, and in which compound double bonds may be present in the positions 5 or 4, when R$_1'$ represents a free oxo group, as well as 7,9(11) and 16 corresponding to the dotted lines with elimination of the 5-positioned H-atom or the substituents R$_5'$ and R$_8'$, as well as to pharmaceutically acceptable acid addition salts.

22. A compound as claimed in claim 21, having the formula

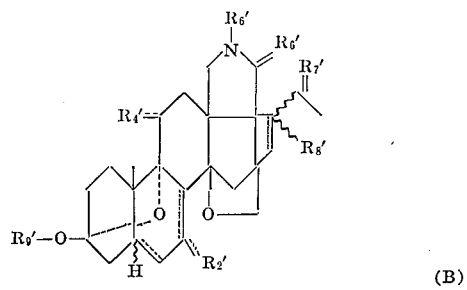

(B)

wherein R$_9'$ represents a lower alkyl group or the benzyl group and the other symbols have the same meaning as the formula A of claim 21 and there may be double bonds in any of the positions 5-, 7- and 16-.

23. A compound as claimed in claim 21, having the formula (I)

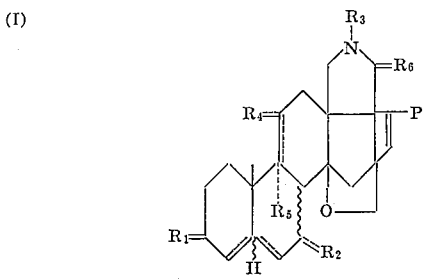

in which P denotes one of the two following partial formulae

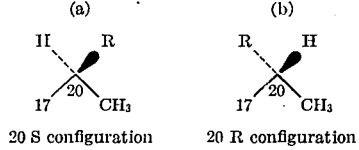

20 S configuration    20 R configuration wherein R represents a free, esterified or etherified hydroxyl group, R$_1$ denotes a free or protected oxo group or a free, esterified or etherified hydroxyl group together with an hydrogen atom, R$_2$ denotes two hydrogen atoms, or a hydrogen atom next to a 7,8-double bond, a free or protected oxo group or an hydrogen atom together with a free, esterified or etherified hydroxyl group, R$_3$ denotes hydrogen, a lower alkyl group or the benzyl group, R$_4$ denotes two hydrogen atoms or a hydrogen atom next to a 9,11-double bond or a free or protected oxo group or a free, esterified or etherified hydroxyl group together with an hydrogen atom, R$_5$ denotes an hydrogen atom or a free, esterified or etherified hydroxyl group and R$_1$ together with R$_5$ denotes a 3$\beta$-hydroxy-3$\alpha$,9$\alpha$-oxido group or a 3$\beta$-hydroxy-3$\alpha$,9$\alpha$-oxido group having the 3-hydroxy group in etherified or esterified form and R$_6$ denotes an oxo group, whereby any protected oxo group is an oxo group ketalized with a lower alkanol or alkanediol, any etherified hydroxyl group is an hydroxyl group etherified with an alcohol containing 1–8 carbon atoms, and any esterified hydroxyl group is an hydroxyl group esterified with a carboxylic acid containing 1–18 carbon atoms, and in which compound, in one of the positions 4,5 or 5,6 and/or, where relevant, in the case that R$_2$ or R$_4$ denotes an H atom, also in one of the positions 7,8 and/or 9,11, double bonds may be present.

24. A compound as claimed in claim 23 of the formula

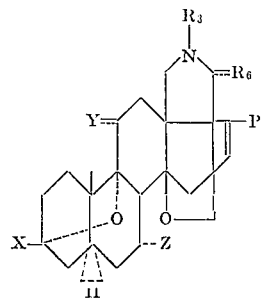

(II)

wherein P has the meaning indicated for the formula I, with the group R representing a free or esterified hydroxyl group, $R_6$ denotes an oxo group, $R_3$ denotes a lower alkyl group with 1–6 carbon atoms, X denotes a free, esterified or etherified hydroxyl group, Y denotes a free or esterified hydroxyl group together with an hydrogen atom or the oxo group and Z denotes an hydrogen atom or a free or esterified hydroxyl group, whereby any protected oxo group is an oxo group ketalized with a lower alkanol or alkanediol, any etherified hydroxyl group is an hydroxyl group etherified with an alcohol containing 1–8 carbon atoms, and any esterified hydroxyl group is an hydroxyl group esterified with a carboxylic acid containing 1–18 carbon atoms, and which compound can optionally, if Z denotes an hydrogen atom, also contains a 7,8-double bond.

* * * * *

UNITED STATES PATENT AND TRADEMARK OFFICE
CERTIFICATE OF CORRECTION

PATENT NO. : 3,875,143
DATED : April 1, 1975
INVENTOR(S) : Hansuli Wehrli et al

It is certified that error appears in the above-identified patent and that said Letters Patent are hereby corrected as shown below:

Column 43, line 65, delete "claim 10" and insert --- claim 1 ---.

Column 45, line 27, delete "claim 10" and insert --- claim 1 ---.

Column 46, line 56, delete "R" and insert --- $R_2$ ---.

Signed and Sealed this

Twenty-ninth Day of March 1977

[SEAL]

Attest:

RUTH C. MASON
*Attesting Officer*

C. MARSHALL DANN
*Commissioner of Patents and Trademarks*